United States Patent
Ananthanarayanan

(10) Patent No.: US 9,937,583 B2
(45) Date of Patent: *Apr. 10, 2018

(54) WELDING ASSEMBLY AND METHOD

(71) Applicant: Innovative Weld Solutions Ltd., Dayton, OH (US)

(72) Inventor: Venkatasubramanian Ananthanarayanan, Beavercreek, OH (US)

(73) Assignee: Innovative Weld Solutions Ltd., Dayton, OH (US)

( * ) Notice: Subject to any disclaimer, the term of this patent is extended or adjusted under 35 U.S.C. 154(b) by 539 days.

This patent is subject to a terminal disclaimer.

(21) Appl. No.: 14/225,641

(22) Filed: Mar. 26, 2014

(65) Prior Publication Data

US 2015/0174692 A1    Jun. 25, 2015

Related U.S. Application Data

(63) Continuation-in-part of application No. 14/140,362, filed on Dec. 24, 2013, now Pat. No. 9,649,717.

(51) Int. Cl.
    *B23K 11/30*    (2006.01)
    *B23K 11/18*    (2006.01)
    (Continued)

(52) U.S. Cl.
    CPC .......... *B23K 11/185* (2013.01); *B23K 11/004* (2013.01); *B23K 11/11* (2013.01);
    (Continued)

(58) Field of Classification Search
    CPC ......... B23K 11/00; B23K 11/16; B23K 11/30; B23K 11/0006; B23K 11/002
    (Continued)

(56) References Cited

U.S. PATENT DOCUMENTS 3,706,955 A    12/1972    Bunnell
3,842,487 A    10/1974    Hartz
(Continued)

FOREIGN PATENT DOCUMENTS

EP    2219268    8/2010
JP    S57121886    7/1982
(Continued)

OTHER PUBLICATIONS

International Search Report and Written Opinion, PCT/US2014/058202 (2014).
(Continued)

*Primary Examiner* — Dana Ross
*Assistant Examiner* — Ayub Maye
(74) *Attorney, Agent, or Firm* — Walters & Wasylyna LLC

(57) ABSTRACT

A welding assembly including a current generator, a first electrode electrically coupled to the current generator, the first electrode including a first engagement surface, a second electrode electrically coupled to the current generator, the second electrode including a second engagement surface, a width-determining fixture positioned between the first electrode and the second electrode to define a welding volume having a width, and an electrically nonconductive material positioned to electrically insulate at least one of the first electrode and the second electrode from an electrical conductor outside the width.

20 Claims, 19 Drawing Sheets

(51) Int. Cl.
*B23K 11/00* (2006.01)
*B23K 11/11* (2006.01)
*B23K 11/36* (2006.01)
*B23K 101/32* (2006.01)
*B23K 101/38* (2006.01)
*B23K 103/10* (2006.01)
*B23K 101/34* (2006.01)

(52) U.S. Cl.
CPC ............ *B23K 11/309* (2013.01); *B23K 11/36* (2013.01); *B23K 2201/32* (2013.01); *B23K 2201/35* (2015.10); *B23K 2201/38* (2013.01); *B23K 2203/10* (2013.01)

(58) Field of Classification Search
USPC ...... 219/117.1, 119, 121.13, 124.02, 136, 56
See application file for complete search history.

(56) References Cited

U.S. PATENT DOCUMENTS

| | | | |
|---|---|---|---|
| 4,214,142 A * | 7/1980 | Crosby | B23K 11/3009 219/119 |
| 4,229,063 A | 10/1980 | Yoshizawa | |
| 4,910,376 A * | 3/1990 | Riley | B23K 35/0205 219/119 |
| 5,739,496 A * | 4/1998 | Asakura | H01R 43/0214 219/119 |
| 6,538,203 B1 | 3/2003 | Nolle et al. | |
| 6,910,925 B2 | 6/2005 | Endo et al. | |
| 7,048,551 B2 | 5/2006 | Takayama | |
| 7,115,004 B2 | 10/2006 | Takayama | |
| 7,174,633 B2 | 2/2007 | Onuma | |
| 7,207,850 B2 | 4/2007 | Takayama | |
| 7,282,679 B2 | 10/2007 | Reichinger | |
| 7,344,421 B1 | 3/2008 | Spencer | |
| 7,374,466 B2 | 5/2008 | Onuma et al. | |
| 7,494,388 B2 | 2/2009 | Kakuta | |
| 7,597,596 B2 | 10/2009 | Watanabe | |
| 7,690,954 B2 | 4/2010 | Watanabe et al. | |
| 7,705,265 B2 | 4/2010 | Asakura et al. | |
| 7,777,133 B2 | 8/2010 | Onuma | |
| 7,803,008 B2 | 9/2010 | Onuma | |
| 7,867,014 B2 | 1/2011 | Kuwayama | |
| 7,896,715 B2 | 3/2011 | Kumakura et al. | |
| 7,905,745 B2 | 3/2011 | Watanabe et al. | |
| 7,905,755 B1 | 3/2011 | Martauz | |
| 7,954,235 B2 | 6/2011 | Martauz et al. | |
| 7,960,652 B2 | 6/2011 | Drew et al. | |
| 8,147,281 B2 | 4/2012 | Kuwayama et al. | |
| 8,181,343 B2 | 5/2012 | Martauz et al. | |
| 8,187,043 B2 | 5/2012 | Kumakura et al. | |
| 8,245,396 B2 | 8/2012 | Kondo et al. | |
| 8,266,798 B2 | 9/2012 | Martauz | |
| 8,333,624 B2 | 12/2012 | Kakuta | |
| 8,360,803 B2 | 1/2013 | Sakai | |
| 8,375,578 B2 | 2/2013 | Kumakura | |
| 8,399,763 B2 | 3/2013 | Horiike et al. | |
| 2004/0065642 A1 * | 4/2004 | Roddy | B23K 11/3009 219/119 |
| 2004/0088857 A1 | 5/2004 | Fujimoto et al. | |
| 2004/0142607 A1 | 7/2004 | Asakura et al. | |
| 2004/0157504 A1 | 8/2004 | Fujimoto et al. | |
| 2006/0169742 A1 | 8/2006 | Fujimoto et al. | |
| 2006/0208838 A1 | 9/2006 | Beuscher et al. | |
| 2007/0184715 A1 | 8/2007 | Onuma | |
| 2007/0272660 A1 * | 11/2007 | Wang | B23K 11/0053 219/93 |
| 2009/0159570 A1 * | 6/2009 | Chen | B23K 11/0053 219/119 |
| 2009/0235521 A1 | 9/2009 | Suzuki et al. | |
| 2009/0269970 A1 | 10/2009 | Kumakura | |
| 2010/0263911 A1 | 10/2010 | Watanabe | |
| 2010/0263912 A1 | 10/2010 | Watanabe | |
| 2011/0014825 A1 | 1/2011 | Drew et al. | |
| 2011/0070771 A1 | 3/2011 | Martauz | |
| 2011/0168680 A1 * | 7/2011 | Holzhauer | B23K 11/3018 219/119 |
| 2012/0318559 A1 | 12/2012 | Aoyagi et al. | |
| 2012/0324727 A1 | 12/2012 | Seifert et al. | |
| 2013/0040511 A1 | 2/2013 | Takashima | |
| 2013/0045610 A1 | 2/2013 | Drew et al. | |
| 2013/0095708 A1 | 4/2013 | Mitose et al. | |
| 2013/0115828 A1 | 5/2013 | Seifert et al. | |
| 2013/0115830 A1 | 5/2013 | Seifert et al. | |
| 2013/0126234 A1 | 5/2013 | One et al. | |
| 2013/0126235 A1 | 5/2013 | Tanikawa et al. | |
| 2014/0102785 A1 * | 4/2014 | Miyamoto | H01R 4/625 174/84 C |

FOREIGN PATENT DOCUMENTS

| | | |
|---|---|---|
| JP | S59197386 | 11/1984 |
| JP | 2001068244 A * | 3/2001 |
| JP | 2013 163210 A | 8/2013 |
| WO | 2010012515 | 2/2010 |
| WO | 2010102845 | 9/2010 |
| WO | 2012048992 | 4/2012 |
| WO | 2012143154 | 10/2012 |
| WO | WO 2013/015076 | 1/2013 |

OTHER PUBLICATIONS

European Patent Office, Extended European Search Report, EP14873299.3 (Aug. 17, 2017).

* cited by examiner

WELDING ASSEMBLY AND METHOD

PRIORITY

This application is a continuation-in-part of U.S. Ser. No. 14/140,362 filed on Dec. 24, 2013, the entire contents of which are incorporated herein by reference.

FIELD

The present disclosure is generally related to welding apparatus, systems and methods and, more particularly, to resistance welding assemblies for welding metal and metal alloy stranded cables or wires.

BACKGROUND

Stranded metals and metal alloys (e.g., stranded cables and wires) find a wide variety of applications. Particularly, stranded aluminum and aluminum alloys find a wide variety of applications due to their favorable combination of electrical conductivity properties and mechanical properties, including strength-to-weight ratio, low temperature (cryogenic) properties, corrosion resistance and notch toughness.

The challenge with stranded aluminum and aluminum alloys is joining (by welding) the stranded cables or wires to one another and/or to a connector. During a welding operation (e.g., resistive welding), individual strands of the cable or wire may not consistently liquefy to form a solid welded workpiece. For example, strands located proximate the periphery of the cable or wire may liquefy; while strands located proximate the center of the cable or wire may not liquefy sufficiently to form a suitably solid weld. In order to sufficiently liquefy strands proximate the center of the cable or wire, the strands located proximate the periphery of the cable or wire may tend to burn and the whole welded assembly may tend to stick to the weld electrodes.

Accordingly, those skilled in the art continue with research and development efforts in the field of welding stranded metals and metal alloys.

SUMMARY

In one embodiment, the disclosed welding assembly may include a current generator, a first electrode electrically coupled to the current generator, the first electrode including a first engagement surface, a second electrode electrically coupled to the current generator, the second electrode including a second engagement surface, a width-determining fixture positioned between the first electrode and the second electrode to define a welding volume having a width, and an electrically nonconductive material positioned to electrically insulate at least one of the first electrode and the second electrode from an electrical conductor outside the width.

In another embodiment, the disclosed welding assembly may include a current generator, a first electrode electrically coupled to the current generator, the first electrode including a first engagement surface, a second electrode electrically coupled to the current generator, the second electrode including a second engagement surface, a width-determining fixture including a first side stop laterally opposed from a second side stop, the first and second side stops defining a welding volume between the first and second electrodes, the welding volume having a width, a workpiece at least partially positioned in the welding volume and clamped between the first and second electrodes, the workpiece including at least a first member and a second member, wherein the second member is supported on the second electrode, and wherein a portion of the second member protrudes outside of the width, and an electrically nonconductive material positioned to electrically insulate the second electrode from the portion of the second member that protrudes outside of the width.

In another embodiment, also disclosed is a method for welding. The method may include the steps of (1) providing a current generator; (2) assembling a workpiece including a first member and a second member, wherein the second member includes strands; (3) positioning a first electrode proximate (at or near) the first member, the first electrode being electrically coupled to the current generator; (4) positioning a second electrode proximate (at or near) the second member, the second electrode being electrically coupled to the current generator; (5) clamping the workpiece between the first electrode and the second electrode; (6) confining the clamped workpiece within a welding volume of a width-determining fixture, the welding volume having a width, wherein a portion of the second member extends outside of the width; (7) electrically isolating the second electrode from the portion of the second member outside of the width; and (8) passing a welding current between the electrodes.

Other embodiments of the disclosed welding assembly and method will become apparent from the following detailed description, the accompanying drawings and the appended claims.

DETAILED DESCRIPTION

Figure 1:
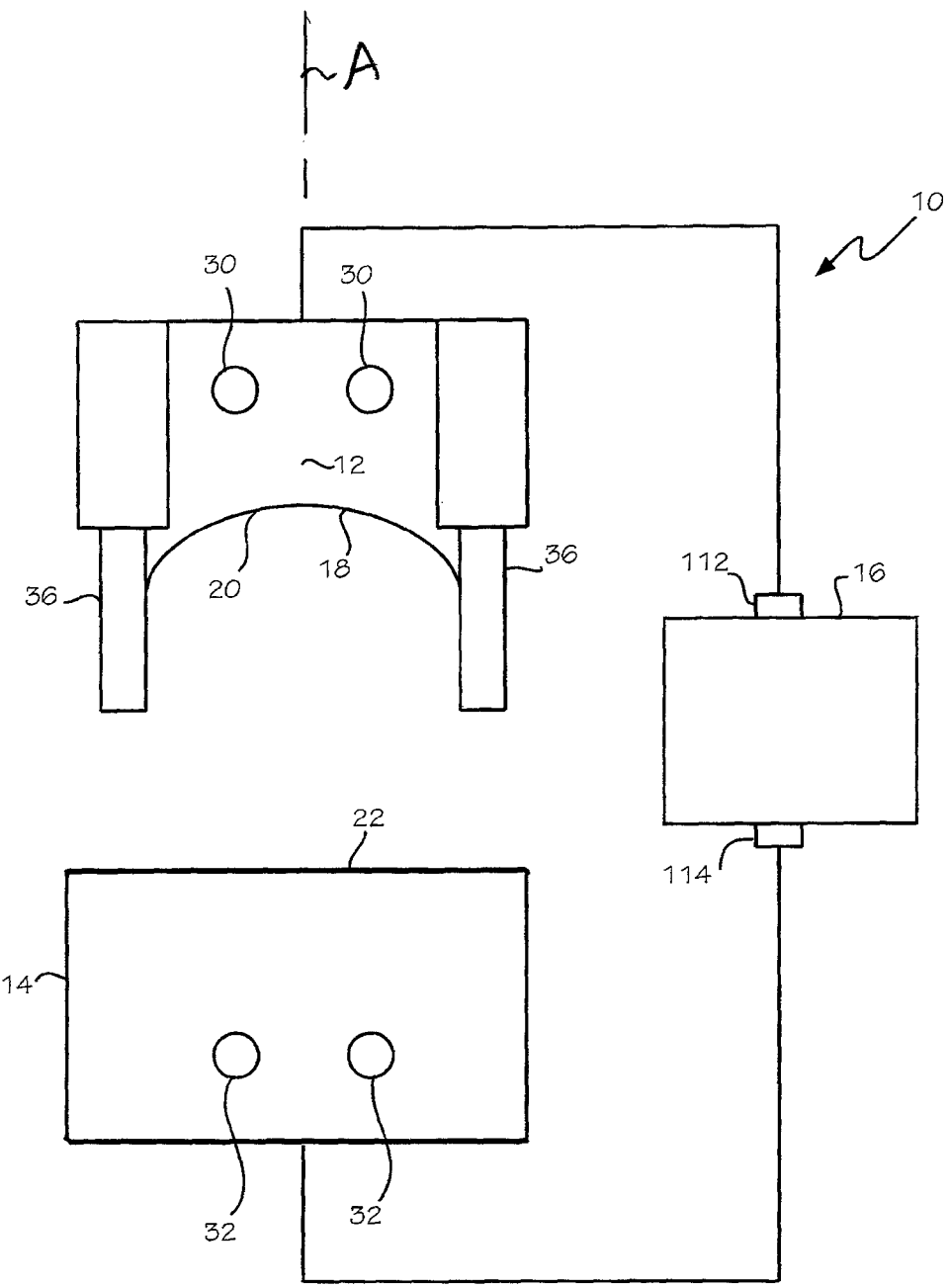
FIG. 1 is a schematic illustration of a first embodiment of the disclosed welding assembly.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 2:
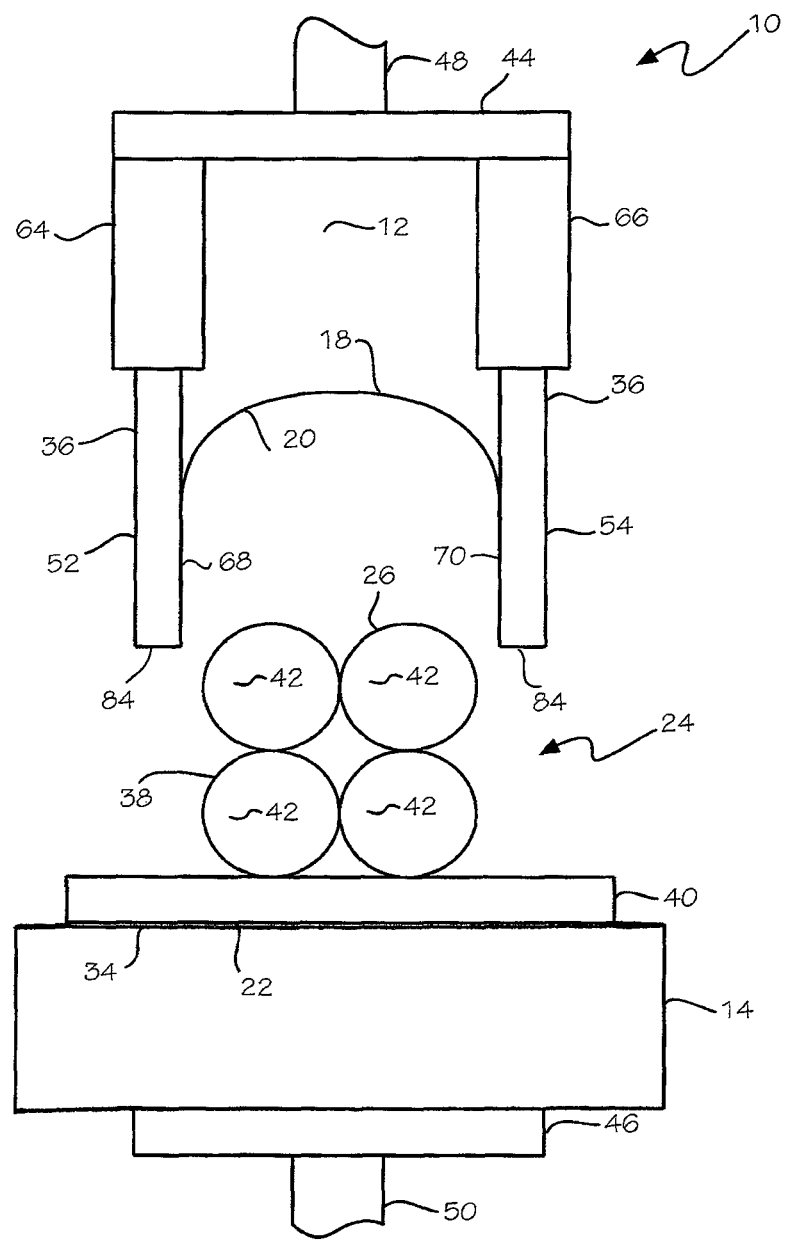
FIG. 2 is a side elevational view of a second embodiment of the disclosed welding assembly.

Referring to FIG. 1, a first embodiment of the disclosed welding assembly, generally designated 10, may include a first (e.g., upper) electrode 12, a second (e.g., lower) electrode 14 and a current generator 16. The first electrode 12 and the second electrode 14 may be located at axially opposite positions relative to the longitudinal axis A of the welding assembly 10. The first electrode 12 may be electrically coupled to the current generator 16 and may include and a first engagement surface 18. The second electrode 14 may be electrically coupled to the current generator 16 and may include a second engagement surface 22. The first engagement surface 18 and the second engagement surface 22 may include size and shape suitable to engage (e.g., contact) at least a portion of an exterior surface of a workpiece 24 (FIG. 2). For example, the first engagement surface 18 of the first electrode 12 and the second engagement surface 22 of the second electrode 14 may be configured to solidify a plurality of metal or metal alloy strands (e.g., a metal or metal alloy stranded cable or wire) and weld the solidified strands to a metal or metal alloy connector terminal.

The current generator 16 may be any source of electrical energy capable of supplying an electric current to the first electrode 12 and the second electrode 14 to achieve resistive heating in the workpiece 24 (FIG. 2). The current generator 16 may include appropriate circuitry for supplying electric current to the first electrode 12 and the second electrode 14, as well as controlling the magnitude and timing of the electric current being supplied to the first electrode 12 and the second electrode 14. For example, the current generator 16 may be a direct current system, an alternating current system or a stored energy current system.

In an example construction, the current generator 16 may include a first terminal 112 and a second terminal 114, the second terminal 114 having a polarity opposite of a polarity of the first terminal 112. The first electrode 12 may be electrically coupled to the first terminal 112. The second electrode 14 may be electrically coupled to the second terminal 114.

At this point, those skilled in the art will appreciate that the current generator 16 may be a commercially available resistance welding machine or a component taken from a commercially available resistance welding machine.

The first electrode 12 and the second electrode 14 may be formed from any electrically conductive material. The first electrode 12 and the second electrode 14 may be formed from a material having a thermal conductivity (e.g., either relatively high thermal conductivity or relatively low thermal conductivity) selected based upon the type weld desired, the material (e.g., aluminum or aluminum alloy) of the workpiece 24, and/or the method for welding being performed by the first electrode 12 and the second electrode 14. For example, the first electrode 12 and/or the second electrodes 14 may be formed from copper or copper alloys (e.g., Resistance Welder Manufacturers Association ("RWMA") copper alloys Classes 1-5 or 20) when relatively high thermal conductivity is desired. Alternatively, the first electrode 12 and/or the second electrodes 14 may be formed from refractory materials, tungsten, tungsten/copper alloys or molybdenum (e.g., RWMA Classes 10-14) when relatively low thermal conductivity is desired. In general, a more conducting electrode material may be used when a steeper thermal gradient is desired between the first electrode 12 and the second electrode 14 and a less conducting electrode material may be used when a less steep temperature gradient is desired between the first electrode 12 and the second electrode 14.

The first electrode 12 and/or the second electrode 14 may be cooled. For example, the first electrode 12 may include one or more first fluid channels 30 defined therein or connected thereto. The second electrode 14 may include one or more second fluid channels 32 defined therein or connected thereto. A cooling fluid (e.g., water or ethyl glycol) may flow through the first fluid channels 30 and/or the second fluid channels 32 to remove heat from the first electrode 12 and the second electrode 14, as well as from the workpiece 24 (FIG. 2) supported by (e.g., positioned between) the first electrode 12 and the second electrode 14.

Figure 3:
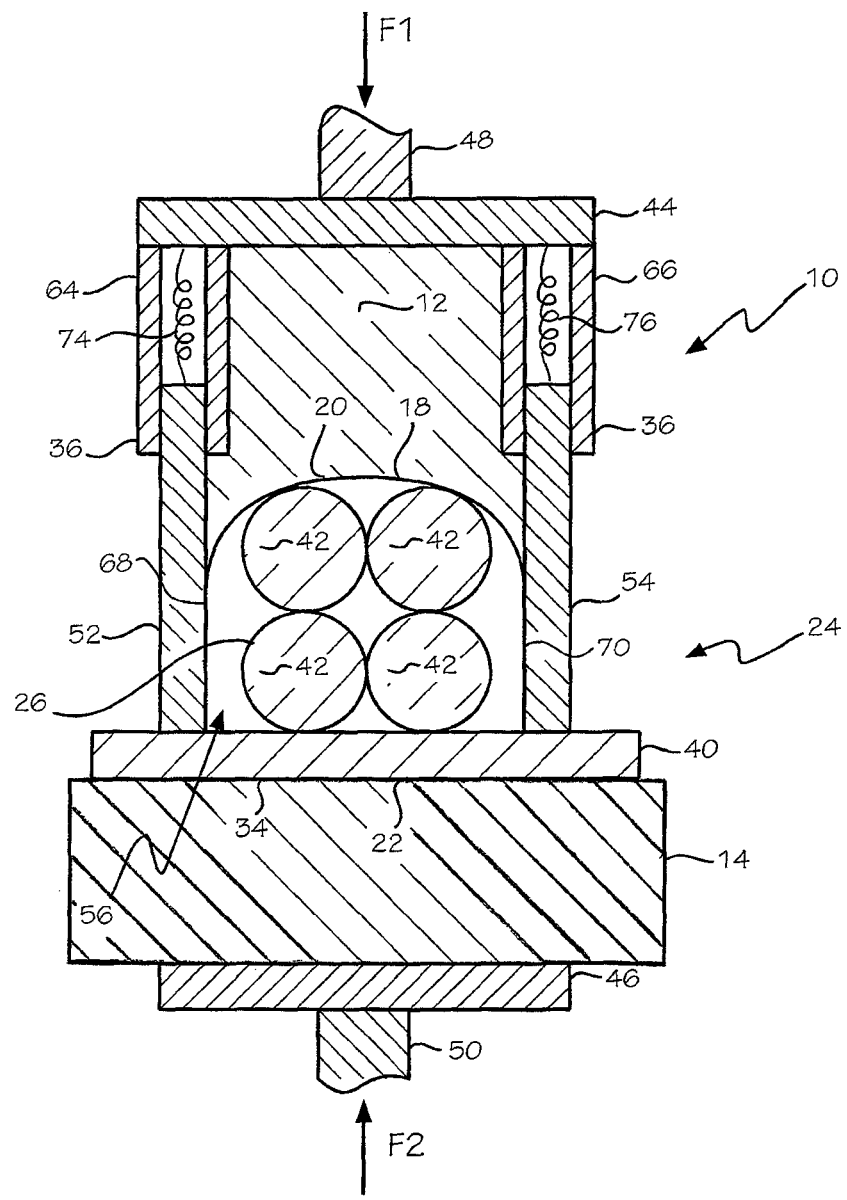
FIGS. 3, 4 and 5 are side elevational views, in section, of a workpiece being welded by the welding assembly of FIG. 2 in accordance with one implementation of the second embodiment.

Referring to FIGS. 2 and 3, in a second embodiment, the first electrode 12 may be mounted to a first support structure 44 and the second electrode 14 may be mounted to a second support structure 46. For example, the first support structure 44 and/or the second support structure 46 may be an arm or a tong. The first support structure 44 and the second support structure 46 may be capable of approximating the first electrode 12 and a second electrode 14 to clamp the workpiece 24 between the first electrode 12 and a second electrode 14.

In an example implementation, the first electrode 12 and the second electrode 14 may exert a clamping force (e.g., a welding force) to the workpiece 24 positioned there between. For example, the first electrode 12 and the second electrode 14 may exert a clamping force of approximately between 50 pounds and 100 pounds. In one example, the first support structure 44 may be moveable such that the first electrode 12 exerts a welding force $F_1$ to the workpiece 24 and the second support structure 44 may be movable such that the second electrode 14 exerts an opposing welding force $F_2$ to the workpiece 24, as illustrated in FIG. 3. As another example, the first support structure 44 may be a movable such that the first electrode 12 exerts a welding force $F_1$ to the workpiece 24 and the second support structure 46 may be stationary (e.g., an anvil).

In an example construction, the first support structure 44 may be connected to a first drive element 48 and/or the second support structure 46 may be connected to a second drive element 50. The first drive element 48 and/or the second drive element 50 may be any mechanism suitable to move (e.g., axially translate) the first support structure 44 and/or the second support structure 44 to approximate the first electrode 12 and the second electrode 14 and exert the clamping force to the workpiece 24. For example, the first drive element 48 and/or the second drive element 50 may be a hydraulic, pneumatic, servo-drive or mechanical drive mechanism (e.g., press).

A width-determining fixture 36 may be positioned between the first electrode 12 and the second electrode 14 to define a welding volume 56 around at least a portion of the workpiece 24. The width-determining fixture 36 may at least partially enclose the workpiece 24 to prevent the flow (e.g., outward flow) of molten or hot metal 72 (FIG. 4) during resistance welding of the workpiece 24. The width-determining fixture 36 may be capable of adjusting an axial position (e.g., parallel to the direction of the clamping force) with respect to the first electrode 12 and/or the second electrode 14 to ensure sides of the welding volume 56 between the first electrode 12 and the second electrode 14 are completely enclosed. The position of the width-determining fixture 36 with respect to the workpiece 24 may define the width W of the welded workpiece 58 (FIG. 5). The side stops (width-determining fixtures) may also be moved out sideways when not welding and moved in when welding, instead of being moved up and down. Such in-and-out movements may also occur through tapered fitting tooling.

Figure 8:
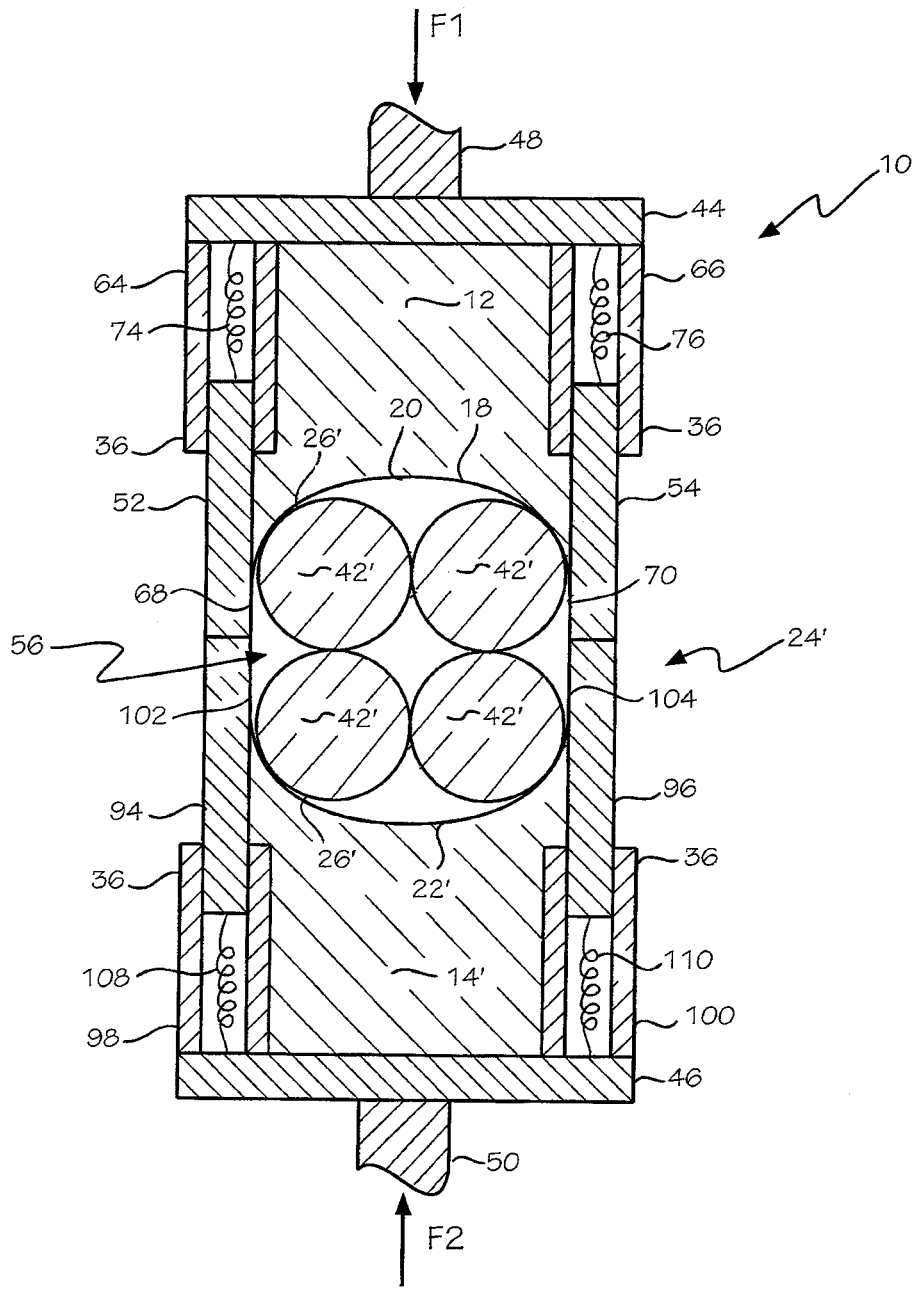
FIGS. 8, 9 and 10 are side elevational views, in section, of a third embodiment of the disclosed welding assembly, shown welding a workpiece.

In one expression, the width-determining fixture 36 may be connected to or otherwise operably engaged with the first support structure 44 and/or the first drive mechanism 48 to approximate the second electrode 14 in response to the welding force $F_1$ (FIG. 3). In another expression, the width-determining fixture 36 may be connected to or otherwise operably engaged with the second support structure 46 and/or the second drive mechanism 50 to approximate the first electrode 12 in response to the welding force $F_2$ (FIG. 3), such as illustrated in FIG. 8.

Referring still to FIGS. 2 and 3, the workpiece 24 may include one or more members 38, 40 intended to be joined by resistive welding. While two members 38, 40 of the workpiece 24 are shown in FIGS. 2 and 3, those skilled in the art will appreciate that additional members may be included in the workpiece 24 without departing from the scope of the present disclosure.

The members 38, 40 of the workpiece 24 may be formed from any material capable of being joined by resistive heating. In one realization, the members 38, 40 of the workpiece 24 may be formed from any metals or metal alloys capable of being joined by resistive heating. For example, members 38, 40 of the workpiece 24 may be formed from aluminum or aluminum alloys.

The member (e.g., a first member) 38 may include at least two strands 42. Each strand 42 may be formed from metal or metal alloy (e.g., aluminum or aluminum alloy). For example, the member 38 may be formed from a plurality of elongated strands 42 bundled together and having a generally circular cross-sectional shape. As a general, non-limiting example, the member 38 may be a metal wire, cable or rope. As a specific, non-limiting example, the member 38 may be a 25 mm², 40 mm² or 50 mm² stranded wire cable.

The member 40 (e.g., a second member) may be a terminal to which the member 38 (e.g., a stranded cable or wire) is joined by welding. For example, the member 40 may be a connector terminal suitable for connection (e.g., mechanical and/or electrical connection) to another object (e.g., an aircraft frame, a vehicle frame or an electrical junction).

The first engagement surface 18 of the first electrode 12 may be formed into an arcuate (e.g., curved) surface defining a concave recess 20 configured to make flush contact with at least a portion of the exterior surface 26 of the member 38. For example, the first engagement surface 18 may be machined as a generally semicircular shape or an inverted U shape defining a generally semicircular recess 20 configured to make flush contact with at least a portion of the exterior surface 26 (e.g., a semi-circular portion of the circumferential exterior surface) of the member 38 (e.g., a stranded cable or wire).

The second engagement surface 22 may be formed into a substantially planar surface configured to make flush contact with at least a portion of the exterior surface 34 of the member 40. For example, the second engagement surface 22 may be machined as a substantially flat shape configured to make flush contact with a substantially planar portion of the exterior surface 34 (e.g., a portion of a bottom surface) of the member 40 (e.g., a connector terminal).

Figure 4:
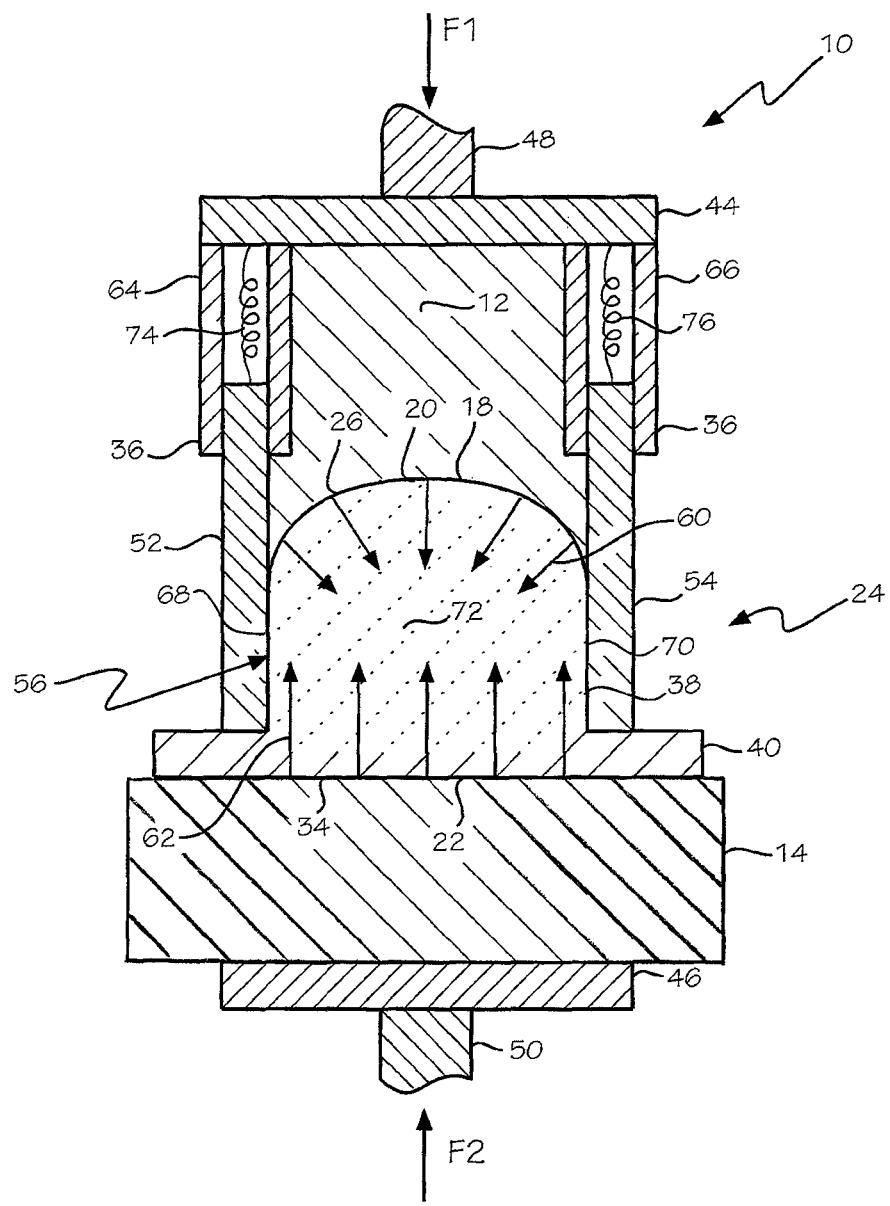
Figure 5:
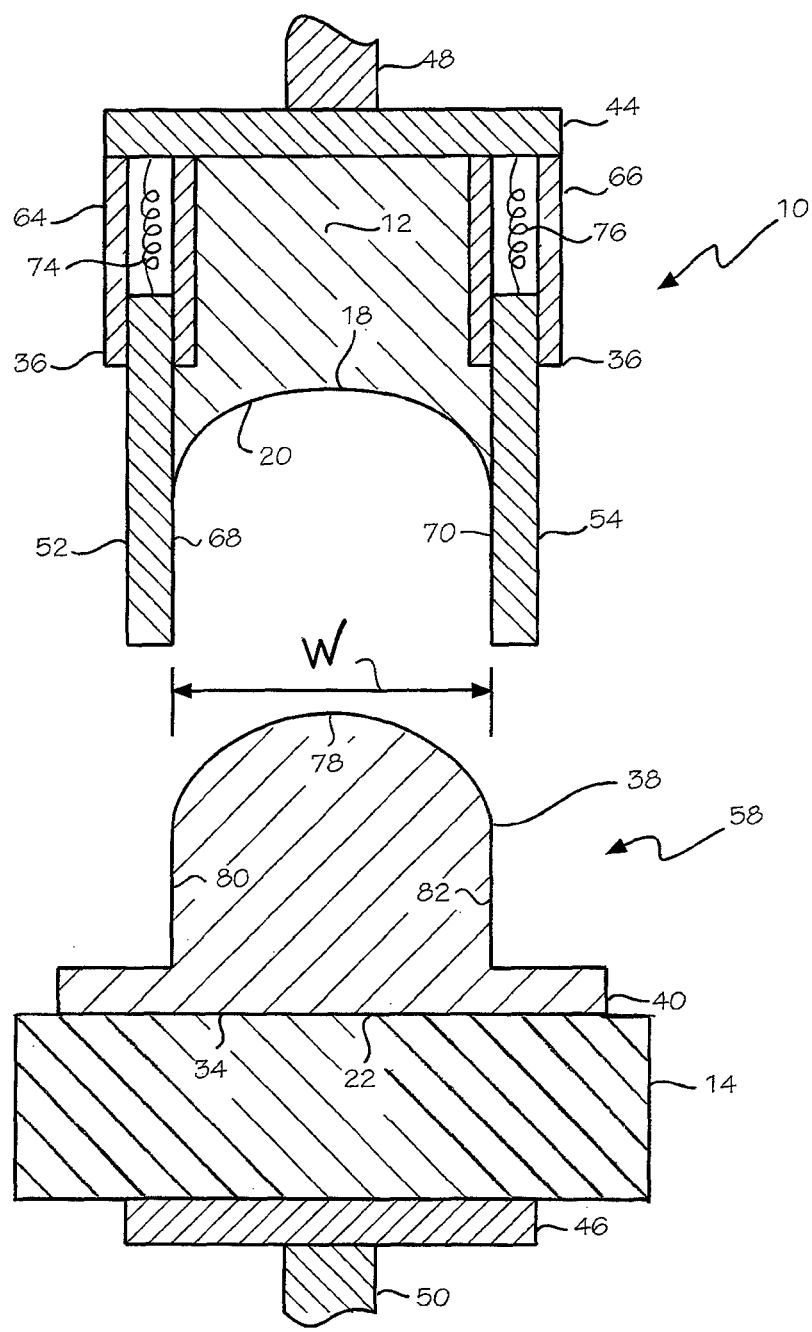

Referring to FIG. 4, the curved first engagement surface 18 of the first electrode 12 may create a larger contact surface area for electrical current to pass from the first electrode 12 to the member 38 (e.g., to the plurality of strands 42) as compared to a planar engagement surface. This larger surface area may decrease the current density at a surface of the workpiece 24 (e.g., between the curved contact surfaces 18 and 26 of the first electrode 12 and the member 38) and increase the current density proximate a center of the workpiece 24. For example, the curved first engagement surface 18 may direct (e.g., focus) the current from the first electrode 12 toward the center of the member 38, as illustrated by directional arrows 60.

The current density at an opposing surface of the workpiece 24 (e.g., between planar contact surfaces 22 and 34 of the second electrode 14 and the member 40) may be higher or lower. For example, the planar second engagement surface 20 may direct the current from the second electrode 14 through the member 40 and through the member 38, as illustrated by directional arrows 62.

Thus, when a voltage is applied between the first electrode 12 and the second electrode 14 (e.g., from the current generator 16), a current flows between the first engagement surface 18 and the second engagement surface 22 through the core of the workpiece 24 along the path indicated by arrows 60 and 62. By decreasing the current density at the exterior surface 26 of the member 38 (e.g., at the exterior surfaces of the strands 42) and increasing the current density toward the center of the member 38, the heat generated proximate (e.g., at or near) the center of the member 38 may become greater than the heat generated at any location on the exterior surface 26 of the member 38 tending to more consistently melt the plurality of strands 42 throughout the member 38.

Those skilled in the art will appreciate that the first engagement surface 18 and the recess 20 may be provided in various sizes (e.g., length and width), shapes (e.g., curve radius) and configurations, for example, depending upon the diameter of the member 38, the number of strands 42 and the length of the member 38 (e.g., length of a portion of the plurality of strands 42) that is to be welded (e.g., solidified).

Referring to FIGS. 3 and 4, the width-determining fixture 36 may be positioned adjacent to the first electrode 12. In one construction, the width-determining fixture 36 may include a first (e.g., left) side stop 52 and a second (e.g., right) side stop 54. The first side stop 52 may be positioned adjacent to (e.g., to the left of) the first electrode 12 and the second side stop 54 may be positioned adjacent to (e.g., to the right of) the first electrode 12 such that the first side stop 52 and the second side stop 54 are positioned to the sides (e.g., the left side and the right side) of the member 38 when the clamping force is exerted to the workpiece 24.

The first side stop 52 and the second side stop 54 may formed from a material having an electrical resistance greater than that of the first electrode 12 and the second electrode 14. For example, the first side stop 52 and the second side stop 54 may be formed from a high resistance metal. As another example, the first side stop 52 and the second side stop 54 may be formed from an electrically insulating or non-conductive material, such as ceramic. In general, the material of the first side stop 52 and the second side stop 54 may be selected to ensure the electrical current is directed through the workpiece 24, such as indicated by directional arrows 60 and 62 (FIG. 4).

In an example embodiment, the first side stop 52 may be housed within a first sleeve 64 and the second side stop 54 may be housed within a second sleeve 66. The first sleeve 64 and the second sleeve 66 may be connected to the first support structure 44 such that the first side stop 52 and the second side stop 54 define the welding volume 56 around (e.g., to the sides of) the member 38 as the first electrode 12 approximates the second electrode 14 in response to the welding force $F_1$ (FIG. 3). When the first electrode 12 approaches the second electrode 14 and exerts the clamping force to the member 38 therebetween, the first side stop 52 and the second side stop 54 may engage the member 40 (e.g., connector terminal) adjacent to the member 38 (e.g., stranded cable). As such, the welding volume 56 may be defined by the first engagement surface 22 of the first electrode 12, an interior surface 68 of the first side stop 52, an interior surface 70 of the second side stop 54 and a portion of the exterior surface 34 (e.g., a top surface) of the member 40 positioned between the first side stop 52 and the second side stop 54.

The position of the first side stop 52 and the second side stop 54 with respect to the first sleeve 64 and the second sleeve 66, respectively, may automatically adjust an axial position (e.g., parallel to the direction of the welding force $F_1$) to constantly engage the exterior surface 34 of the member 40 and contain the flow of molten metal 72 within the welding volume 56, as illustrated in FIG. 4. The first side stop 52 may be outwardly biased from within the first sleeve 64 and the second side stop 54 may be outwardly biased from within the second sleeve 66. For example, the first side stop 52 may be connected within the first sleeve 64 by a first biasing element 74 (e.g., a spring) and the second side stop 54 may be connected within the second sleeve 66 by a second biasing element 76 (e.g., a spring). A bottom surface 84 (FIG. 2) of the first side stop 52 and the second side stop 54 may be substantially planar to make flush contact with the substantially planar exterior surface 34 of the member 40.

As the first support structure 48 approximates the second support structure 46 (e.g., via the first drive element 48), the first electrode 12 may move toward and exert a welding force $F_1$ (e.g., clamping force) upon the member 38 and the first side stop 52 and the second side stop 54 may simultaneously move toward and engage the member 40. As the first support structure 48 further approximates the second support structure 46, the welding force $F_1$ exerted to the member 38 by the first electrode 12 and the second electrode 14 may increase as the first electrode 12 approximates the second electrode 14; however, the first side stop 52 and the second side stop 54 may be at least partially pushed into the first sleeve 64 and the second sleeve 66, respectively, to prevent damage to the member 40 while maintaining flush contact with the member 40 and containing the outward flow of the molten metal 72 (FIG. 4).

Referring to FIG. 5, the welded workpiece 58 may have a shape substantially matching the shape of the welding volume 56. For example, welded workpiece 58 may include a curved upper end 78 substantially matching the curved first engagement surface 18 of the first electrode 12, a planar first (e.g., left) side 80 substantially matching the planar first interior surface 68 of the first side stop 52 and a planar second (e.g., right) side 82 substantially matching the planar second interior surface 70 of the second side stop 54. The welded workpiece 58 may include a solidified portion of the plurality of strands 42 of the member 38 (e.g., a stranded cable) joined to the member 40 (e.g., a connector terminal) through resistive welding.

Figure 6:
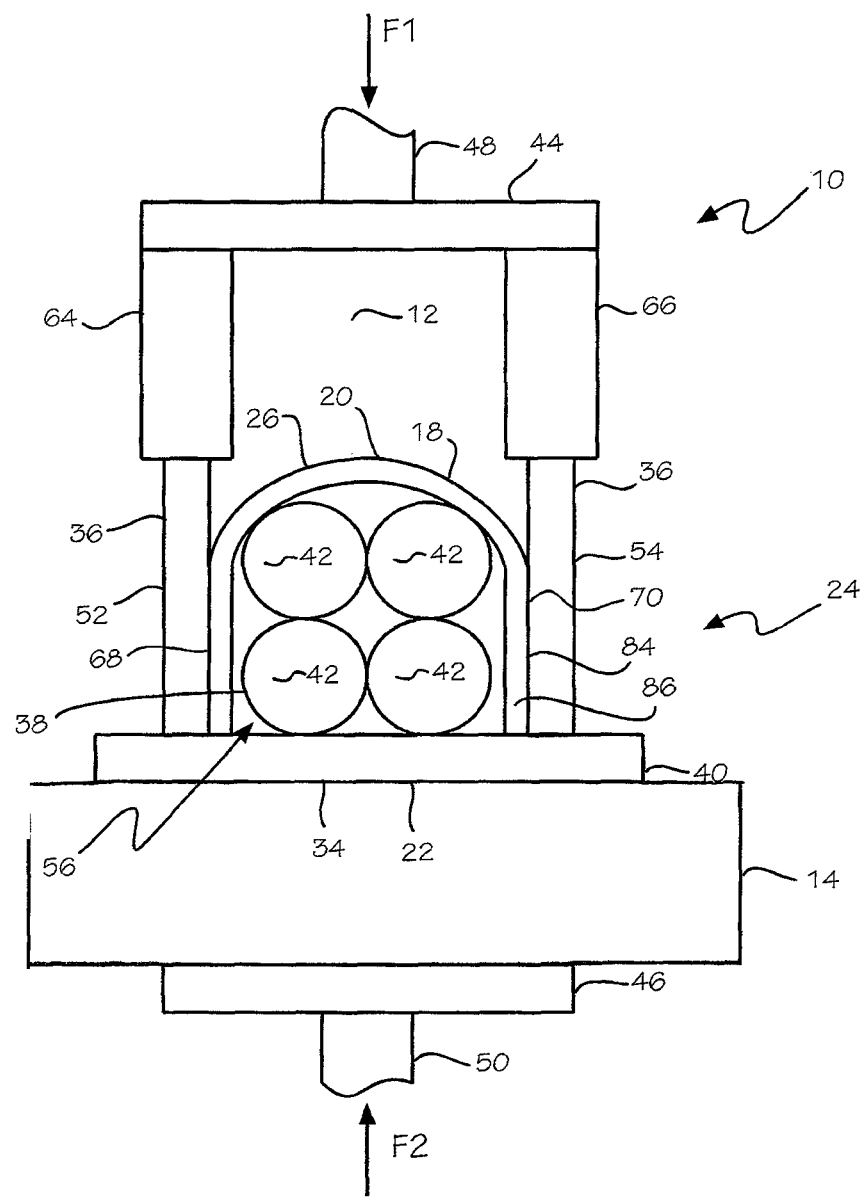
FIG. 6 is a side elevational view, in section, of a workpiece being welded by the welding assembly of FIG. 2 in accordance with another implementation of the second embodiment.
Figure 7:
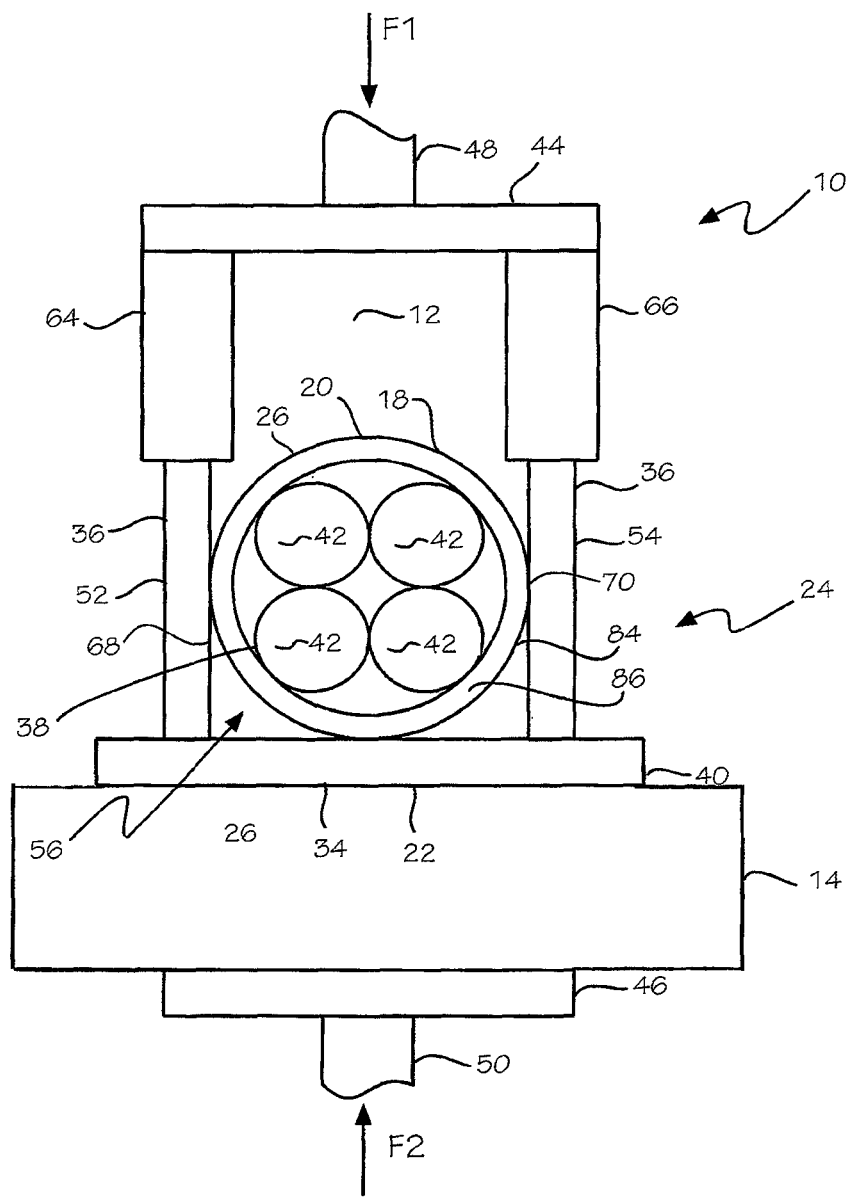
FIG. 7 is a side elevational view, in section, of a workpiece being welded by the welding assembly of FIG. 2 in accordance with yet another implementation of the second embodiment.

Referring to FIGS. 6 and 7, the workpiece 24 may also include an auxiliary member 84. The auxiliary member 84 may have a size and shape sufficient to at least partially surround the workpiece 24. The auxiliary member 84 may be formed from a material having the same or similar chemistry as the members 38, 40, or from a material that is compatible with the material from which the members 38, 40 are formed. For example, when the members 38, 40 are formed from aluminum alloys, the auxiliary member 84 may be formed from an aluminum alloy or appropriate aluminum alloy filler metal.

As illustrated in FIG. 6, in one implementation, the auxiliary member 84 may be a generally semi-circular band 86 having an arcuate (e.g. curved) body (e.g., U-shaped) of sufficient size and shape to at least partially surround (e.g., cover) the exterior surface 26 of the member 38 (e.g., a stranded cable) and ends that extend to engage the exterior surface 34 of the member 40 (e.g., a connector terminal).

As illustrated in FIG. 7, in another implementation, the auxiliary member 84 may be a generally circular band 88 having a continuous body of sufficient size and shape to completely surround (e.g., cover) the exterior surface 26 of the member 38 (e.g., a stranded cable).

The curved first engagement surface 18 of the first electrode 12 may include a sufficient shaped and size to contact at least a portion of an exterior surface 26 the auxiliary member 84 and focus electrical current toward the center of the workpiece 24 (e.g., the member 38) in a similar manner as described above and illustrated in FIG. 4.

The material of the auxiliary member 84 may melt during resistance welding and combine with the molten metal 72 (FIG. 4) within the welding volume 56 to further solidify the plurality of strands 42 of the member 38 into a solid welded workpiece 58, such as illustrated in FIG. 5. The first side stop 52 and the second side stop 54 may be positioned adjacent to (e.g., to the sides of) the auxiliary member 84 when the first electrode 12 exerts welding force $F_1$ upon the workpiece 24.

Referring to FIG. 8, the workpiece 24' may include a member 38' intended to be solidified by resistive welding. The member 38' may include a plurality of strands 42'. Each strand 42' may be formed from metal or metal alloy (e.g., aluminum or aluminum alloy). For example, the member 38' may be formed from a plurality of elongated strands 42' bundled together and having a generally circular cross-sectional shape. As a general, non-limiting example, the member 38' may be a metal wire, cable or rope. As a specific, non-limiting example, the member 38' may be a 25 $mm^2$, 40 $mm^2$ or 50 $mm^2$ stranded wire cable.

While four strands 42' of the member 38' of the workpiece 24 are shown in FIGS. 8, 9, 10 and 11, those skilled in the art will appreciate that additional strands 42' of the member 38' may be included in the workpiece 24' without departing from the scope of the present disclosure.

In accordance with a third embodiment, the second engagement surface 22' of the second electrode 14' may be formed into an arcuate (e.g. curved) surface defining a concave recess 28. For example, the second engagement surface 22' may be machined as a generally semicircular shape defining a generally semicircular recess 28. The first engagement surface 18 and the second engagement surface 22' may include size and shape suitable to engage (e.g., contact) at least a portion of an exterior surface 26' of the workpiece 24' (e.g., an exterior surface of the plurality of strands 42' of the member 38'). For example, the first engagement surface 18 of the first electrode 12 and the second engagement surface 22' of the second electrode 14' may be configured to solidify the plurality of metal strands 42' of the member 38' (e.g., a stranded cable).

Figure 9:
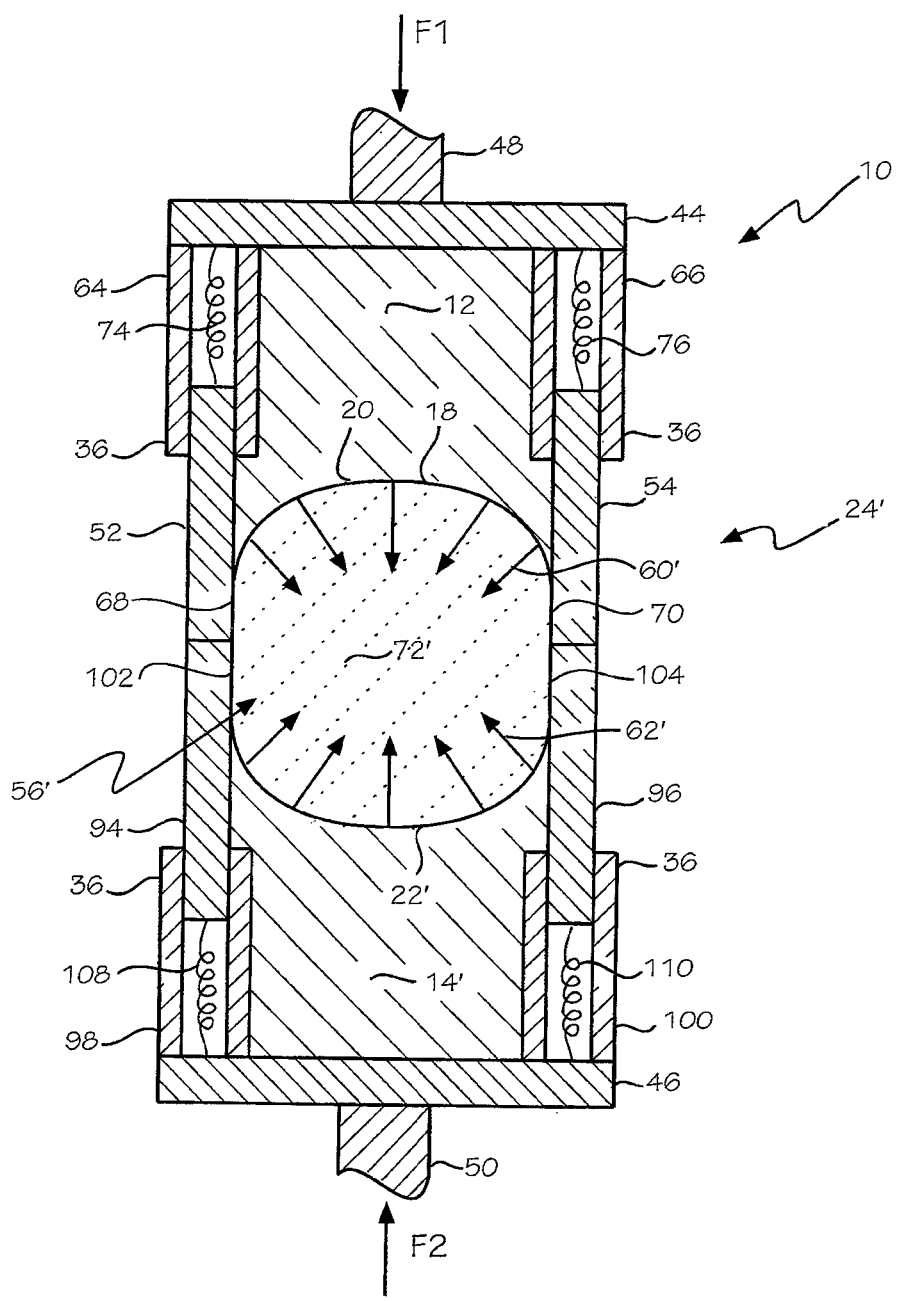

Referring to FIG. 9, the curved first engagement surface 18 of the first electrode 12 and the curved second engagement surface 22' of the second electrode 14' may create a larger contact surface area for electrical current to pass from the first electrode 12 and the second electrode 14' to the member 38' as compared to a planar engagement surface. This larger surface area may decrease the current density at a surface of the workpiece 24' (e.g., between the curved contact surfaces 18, 22' and 26' of the first electrode 12 and the second electrode 14' and the member 38', respectively) and increase the current density at the center of the workpiece 24'. For example, the curved first engagement surface 18 and the curved second engagement surface 22' may direct (e.g., focus) the current from the first electrode 12 and the second electrode 14' toward the center of the member 38', as illustrated by directional arrows 60' and 62'.

The width-determining fixture 36 may be positioned adjacent to the first electrode 12 and the second electrode 14'. In an example embodiment, the width-adjusting fixture 36 may include a first (e.g., left) side stop 52 and an opposing second (e.g., right) side stop 54 adjacent the first electrode 12 and a third (e.g., left) side stop 94 and an opposing fourth (e.g., right) side stop 96 adjacent the second electrode 14'. The first side stop 52, the second side stop 54, the third side stop 94 and the fourth side stop 96 may be positioned to the sides (e.g., the left side and the right side) of the member 38' to at least partially define the welding volume 56' around (e.g., to the sides of) the member 38' as the first electrode 12 approximates the second electrode 14' in response to the welding force $F_1$ and/or $F_2$.

The third side stop 94 may be housed within a third sleeve 98 and the fourth side stop 96 may be housed within a fourth sleeve 102. The third sleeve 98 and the fourth sleeve 100 may be connected to the second support structure 44. When the first electrode 12 approximates the second electrode 14' and exert a clamping force to the member 38' therebetween, the first side stop 52 may engage (e.g., contact) the third side stop 98 and the second side stop 54 may engage the fourth side stop 100. As such, the welding volume 56' may be defined by the first engagement surface 22 of the first electrode 12, the interior surface 68 of the first side stop 52, an interior surface 102 of the third side stop 98, the interior surface 70 of the second side stop 54, the interior surface 104 of the fourth side stop 100 and the second engagement surface 22' of the second electrode 14'.

The position of the first side stop 52 and the third side stop 94 with respect to the first sleeve 64 and the third sleeve 98, respectively, may automatically adjust position an axial position (e.g., parallel to the direction of the welding force $F_1$ and $F_2$) to constantly engage each other and contain the flow of molten metal 72' within the welding volume 56', as illustrated in FIG. 9. Similarly, the position of the second side stop 54 and the fourth side stop 96 may automatically adjust an axial position with respect to the second sleeve 66 and the fourth sleeve 100, respectively, to constantly engage each other and contain the flow of molten metal 72' within the welding volume 56'.

For example, the third side stop 94 may be outwardly biased from within the third sleeve 98 and the fourth side stop 96 may be outwardly biased from within the fourth sleeve 100. In an example construction, the third side stop 94 may be connected within the third sleeve 98 by a third biasing element 108 (e.g., a spring) and the fourth side stop 96 may be connected within the fourth sleeve 100 by a fourth biasing element 110 (e.g., a spring). Engaging surfaces of the first side stop 52 and the third side stop 94 may be substantially planar to make flush contact with each other and engaging surfaces the second side stop 54 and the fourth side stop 96 may be substantially planar to make flush contact with each other.

Figure 10:
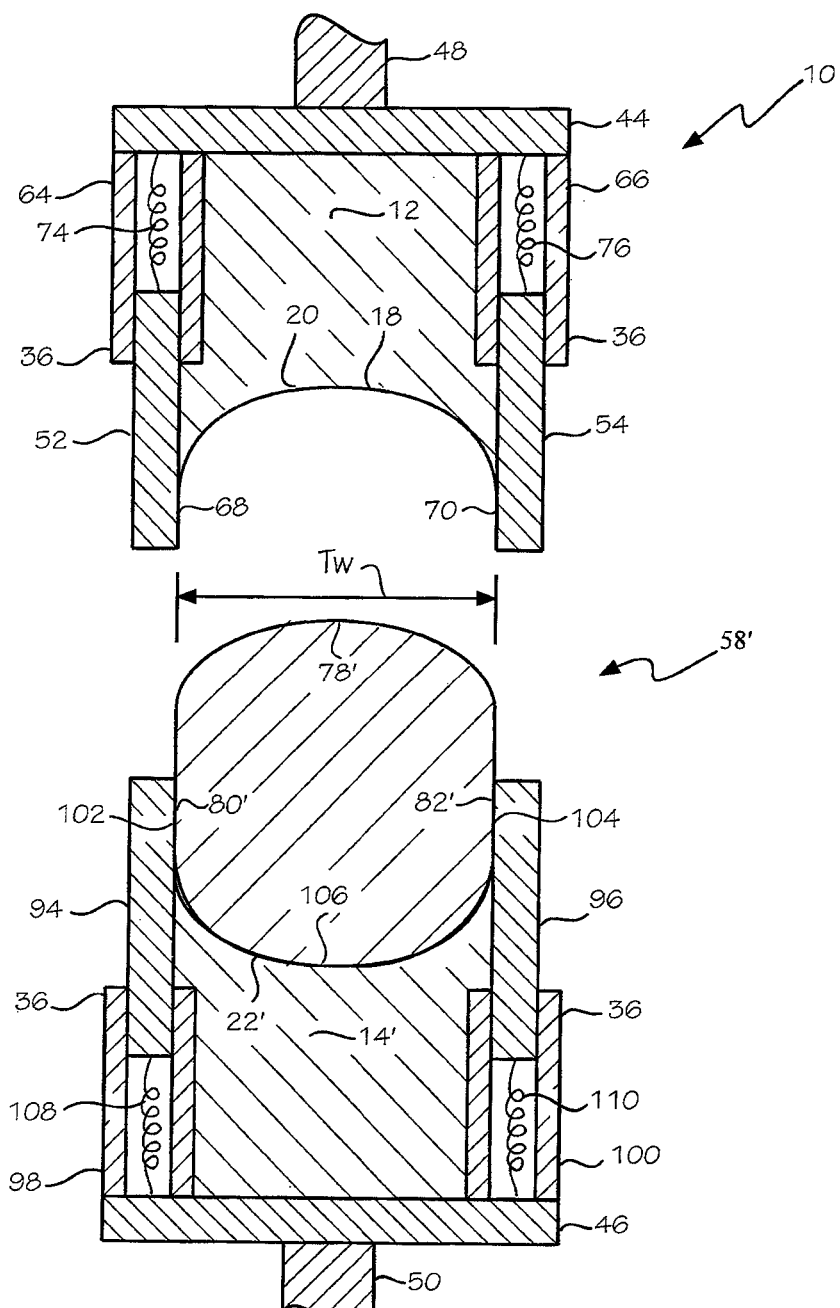

Referring to FIG. 10, the welded workpiece 58' may have a shape substantially matching the shape of the welding volume 56'. For example, welded workpiece 58' may include a curved upper end 78' substantially matching the curved first engagement surface 18 of the first electrode 12, a planar first (e.g., left) side 80' substantially matching the planar interior surface 68 of the first side stop 52 and the interior surface 102 of the third side stop 94, a planar second (e.g., right) side 82' substantially matching the planar interior surface 70 of the second side stop 54 and interior surface 104 of the fourth side stop 96 and a curved lower end 106 substantially matching the curved second engagement surface 22' of the second electrode 14'. For example, the welded workpiece 58' may include a solidified portion of the plurality of strands 42' of the member 38' (e.g., a stranded cable).

Figure 11:
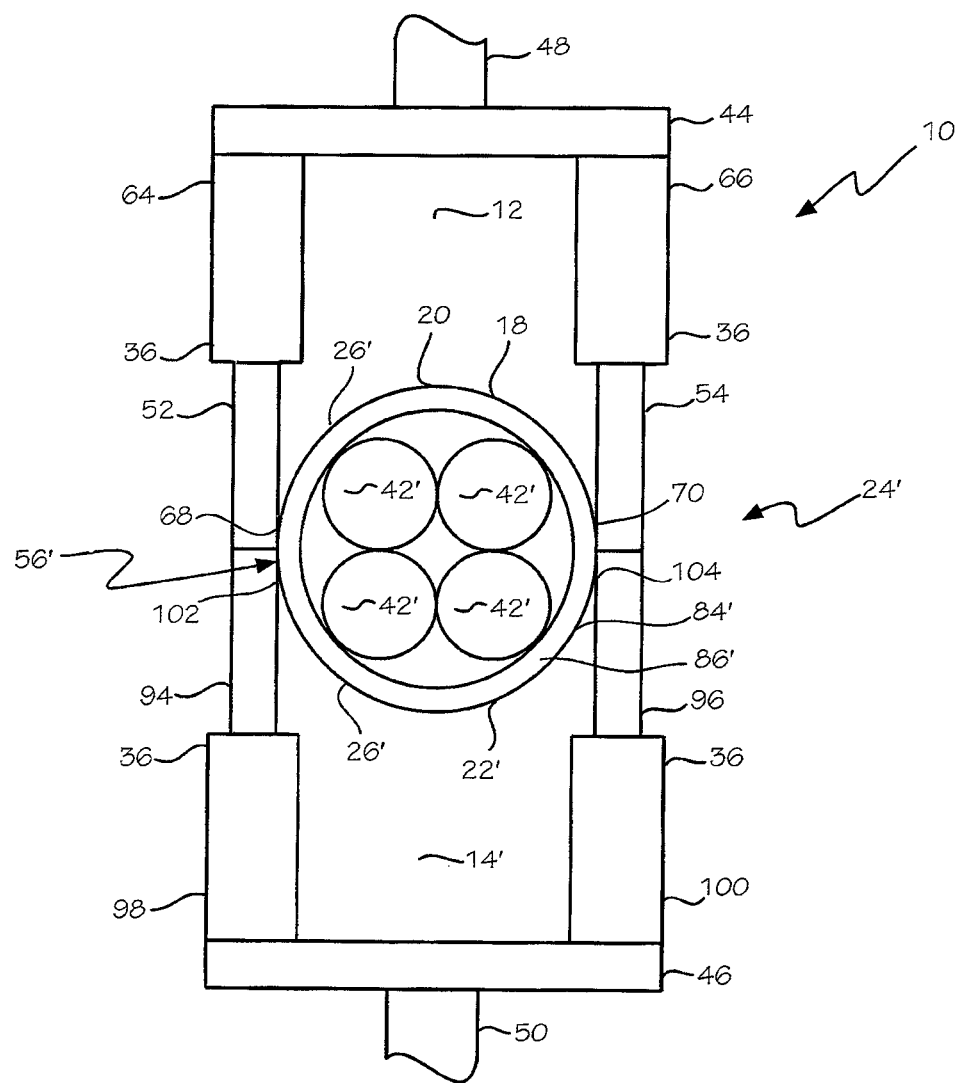
FIG. 11 is a side elevational view, in section, of a workpiece being welded by the welding assembly of FIG. 8 in accordance with another implementation of the third embodiment.

Referring to FIG. 11, in another implementation, the workpiece 24' may also include an auxiliary member 84'. The auxiliary member 84' may have a size and shape sufficient to at least partially surround the workpiece 24'. For example, the auxiliary member 84' may be a generally circular band 88' having a continuous body of sufficient size and shape to completely surround (e.g., cover) the exterior surface 26' of the member 38' (e.g., a stranded cable)

For example, the curved first engagement surface 18 of the first electrode 12 may contact at least a portion (e.g., an upper portion) of the exterior surface 26' of the auxiliary member 84' and the curved second engagement surface 22' of the second electrode 14' may contact at least a portion (e.g., a lower portion) of the exterior surface 26' of the auxiliary member 84' to focus electrical current toward the center of the workpiece 24' in a similar manner as described above and illustrated in FIG. 9.

Figure 12:
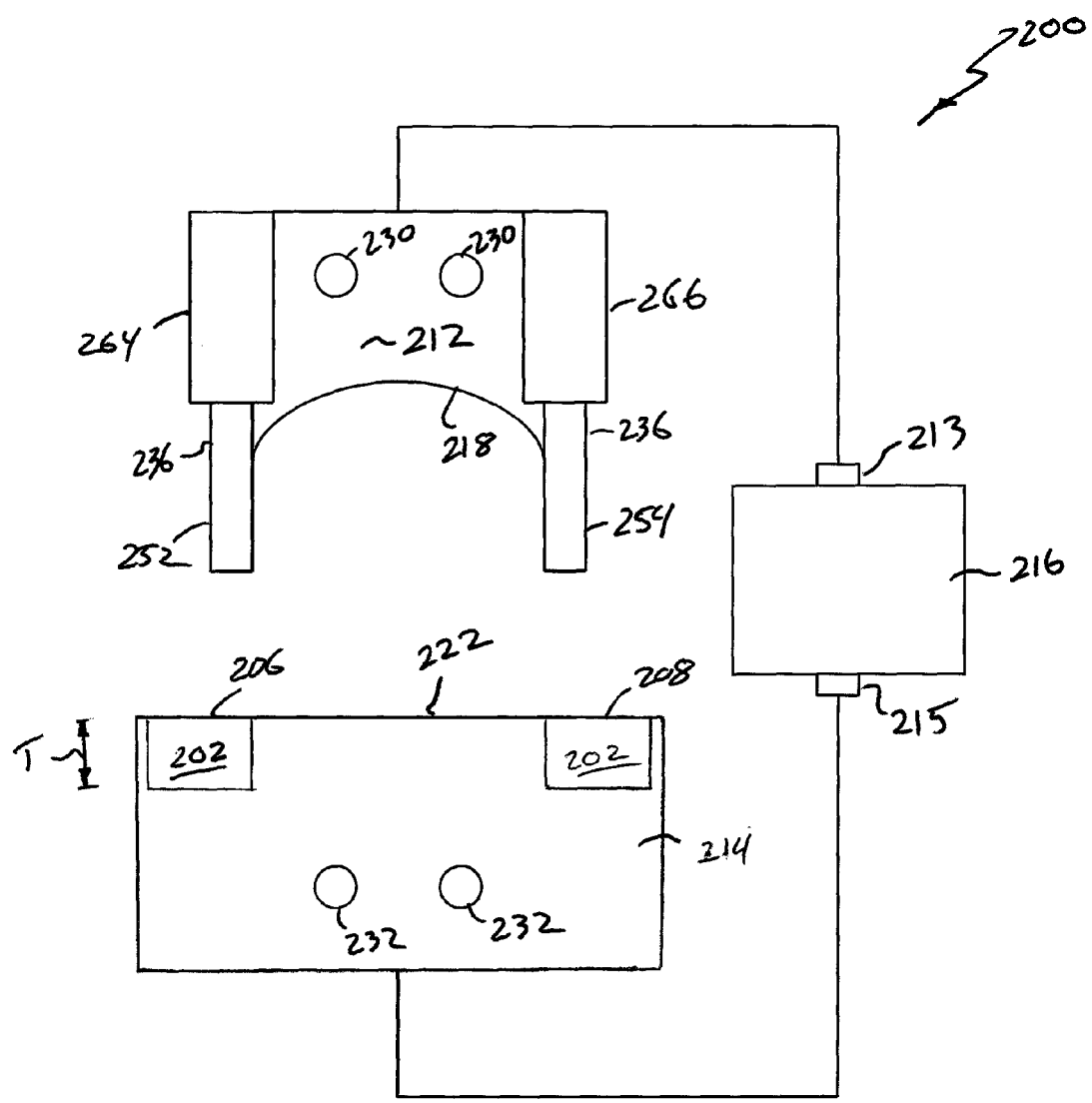
FIG. 12 is a schematic illustration of a fourth embodiment of the disclosed welding assembly.

Referring to FIG. 12, a fourth embodiment of the disclosed welding assembly, generally designated 200, may include a first (e.g., upper) electrode 212, a second (e.g., lower) electrode 214, a current generator 216, a width-determining fixture 236 and an electrically nonconductive material 202. The electrically nonconductive material 202 may be present in the welding assembly 200 as a first portion 206 of electrically nonconductive material 202 and a second portion 208 of electrically nonconductive material 202.

With the exception of the presence of electrically nonconductive material 202, the welding assembly 200 may be configured in the same or similar manner as the welding assembly 10 shown in FIG. 1. Specifically, the first electrode 212 may include a first engagement surface 218 and optionally one or more cooling channels 230, the second electrode 214 may by axially opposed from the first electrode 212 and may include a second engagement surface 222 and optionally one or more cooling channels 232, the current generator 216 may include first and second terminals 213, 215 electrically coupled to the first and second electrodes 212, 214, and the width-determining fixture 236 may include side stops 252, 254, which may be biased out of associated sleeves 264, 266 toward the second electrode 214.

The electrically nonconductive material 202 may be substantially electrically nonconductive, particularly relative to the electrical conductivity of the second electrode 214.

Therefore, when the electrically nonconductive material 202 is positioned between an electrical conductor (e.g., the width-determining fixture 236 and/or the workpiece 224 (see FIG. 13)) and the second electrode 214, the electrically nonconductive material 202 may function as an electrical insulator therebetween.

Thus, when the electrically nonconductive material 202 is properly positioned relative to the second electrode 214, such as vertically below the side stops 252, 254 of the width-determining fixture 236 and sufficiently laterally outside of the side stops 252, 254, shunting of the welding current from the first electrode 212, through the width-determining fixture 236, and to the second electrode 214 (or vice versa) may be substantially inhibited (if not eliminated), thereby focusing the welding current into the workpiece 224 (FIG. 13) that is between the electrodes 212, 214 and the width-determining fixture 236.

The electrically nonconductive material 202 may have a composition that renders the electrically nonconductive material 202 sufficiently hard and durable to withstand the clamping forces applied during welding. Additionally, the composition of the electrically nonconductive material 202 may render the electrically nonconductive material 202 capable of withstanding welding temperatures without melting, decomposing or otherwise degrading.

As one general, non-limiting example, the electrically nonconductive material 202 may be (or may include) a ceramic material. As one specific, non-limiting example, the electrically nonconductive material 202 may be (or may include) titanium nitride. As another specific, non-limiting example, the electrically nonconductive material 202 may be (or may include) a machinable ceramic, such as MACOR® machinable glass ceramic commercially available from Corning Incorporated of Corning, N.Y.

The electrically nonconductive material 202 may have a cross-sectional thickness T sufficient to impart the required physical properties. Depending on composition, if the cross-sectional thickness T is too thin, then the electrically nonconductive material 202 may be brittle. For example, when the electrically nonconductive material 202 is a ceramic, a cross-sectional thickness T ranging from about 2 mm to about 10 mm or more may be sufficient for the intended purpose, and may facilitate securing the electrically nonconductive material 202 to the second electrode 214 with a mechanical fastener 294, as shown in FIG. 14.

Referring to FIGS. 13-16, a fifth embodiment of the welding assembly 200 may be configured in the same or similar manner as the welding assembly 10 shown in FIGS. 2-5, with the exception of the presence of first and second portions 206, 208 of electrically nonconductive material 202.

Figure 13:
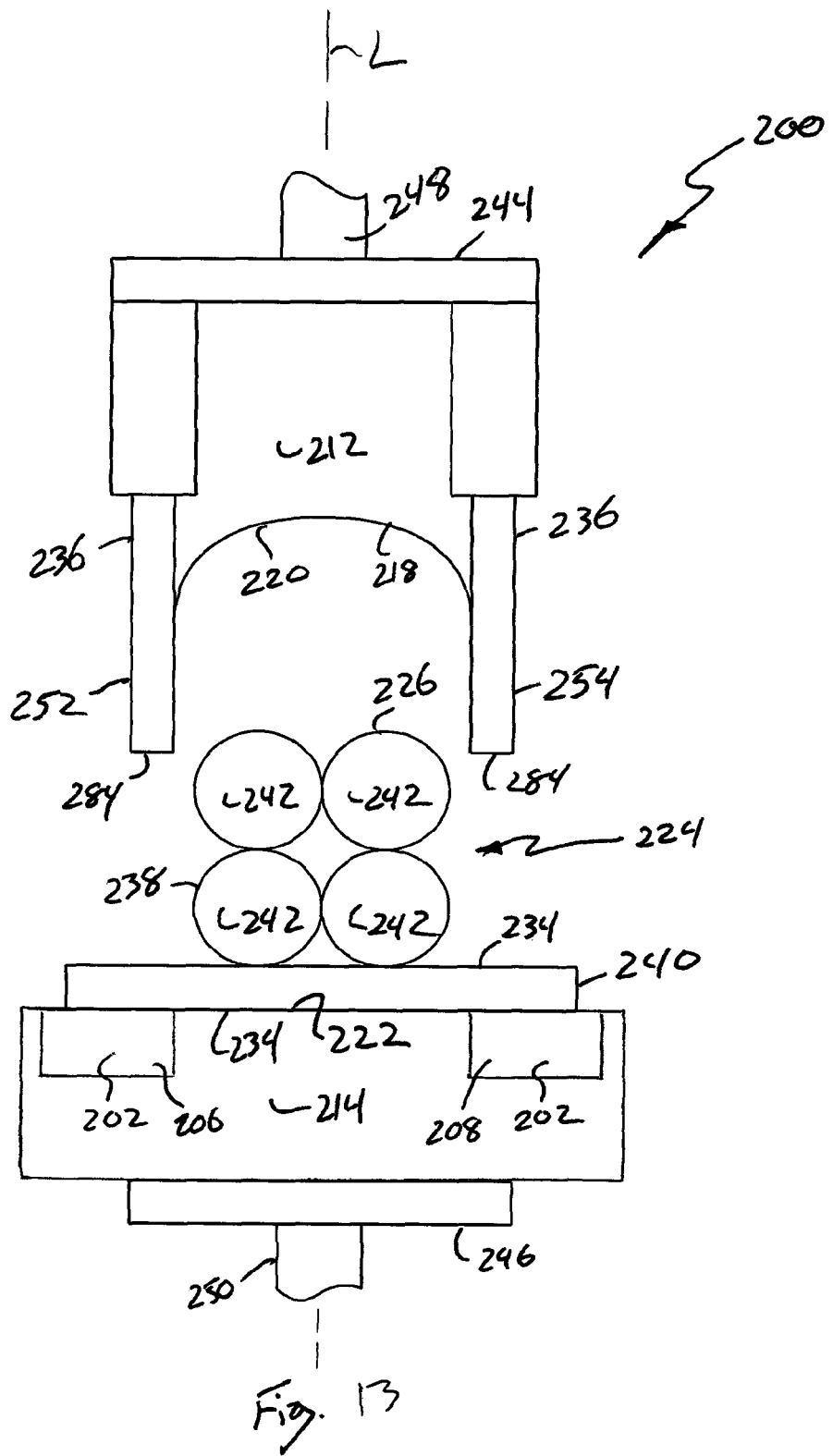
FIG. 13 is a side elevational view of a fifth embodiment of the disclosed welding assembly.
Figure 14:
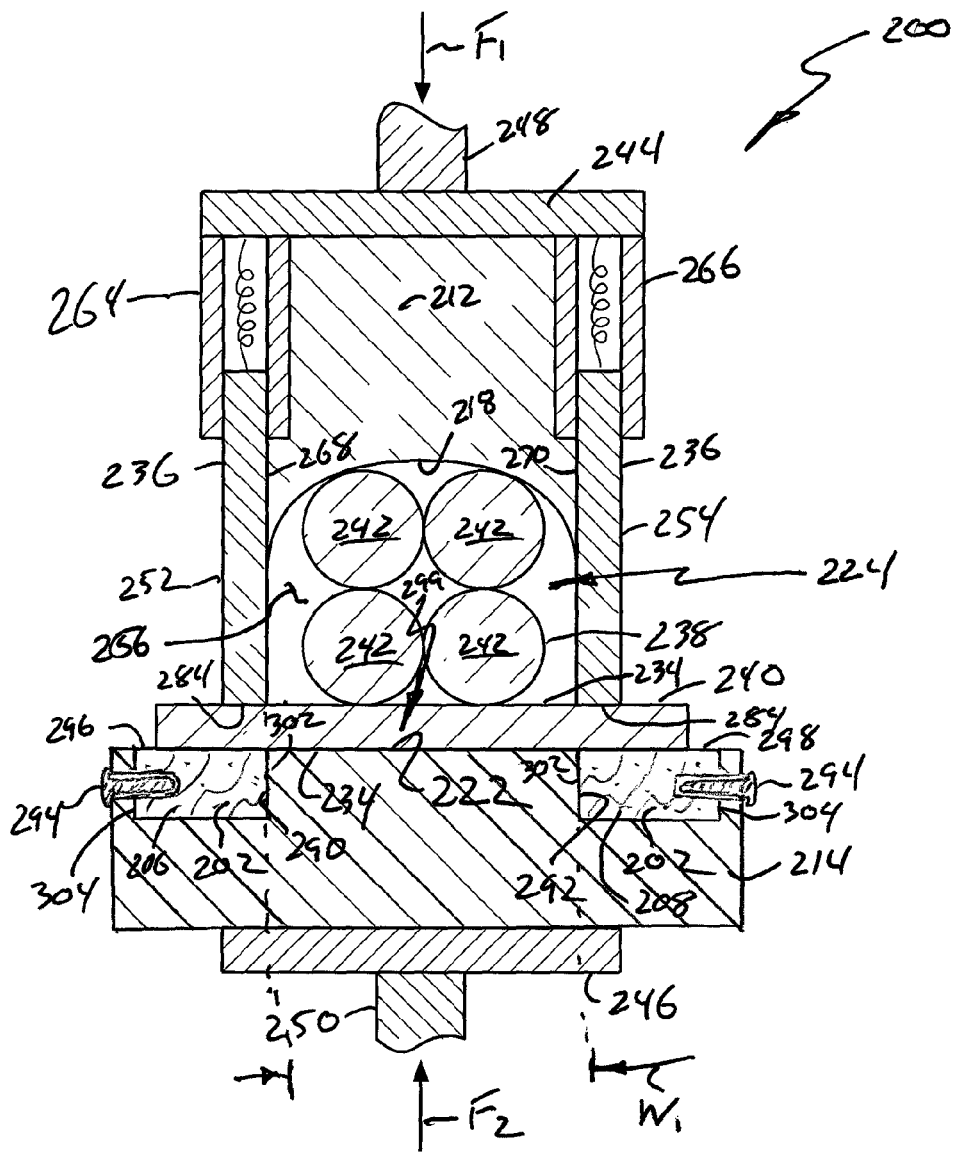
FIGS. 14, 15 and 16 are side elevational views, in section, of a workpiece being welded by the welding assembly of FIG. 13 in accordance with one implementation of the fifth embodiment.

With reference to FIGS. 13 and 14, the first electrode 212 may be mounted to a first support structure 244 and the second electrode 214 may be mounted to a second support structure 246. For example, the first support structure 244 and/or the second support structure 246 may be an arm or a tong. The first support structure 244 and the second support structure 246 may be capable of approximating the first electrode 212 and a second electrode 214 along the longitudinal axis L (FIG. 13) of the welding assembly 200 to clamp the workpiece 224 between the first electrode 212 and a second electrode 214.

The first electrode 212 and the second electrode 214 may exert a clamping force (e.g., a welding force) to the workpiece 224 positioned there between. For example, the first electrode 212 and the second electrode 214 may exert a clamping force of approximately between 50 pounds and 100 pounds. In one construction, the first support structure 244 may be moveable such that the first electrode 212 exerts a welding force $F_1$ to the workpiece 224 and the second support structure 244 may be movable such that the second electrode 214 exerts an opposing welding force $F_2$ to the workpiece 224, as illustrated in FIG. 14. In another construction, the first support structure 244 may be a movable such that the first electrode 212 exerts a welding force $F_1$ to the workpiece 224 and the second support structure 246 may be stationary (e.g., an anvil).

The first support structure 244 may be connected to a first drive element 248 and/or the second support structure 246 may be connected to a second drive element 250. The first drive element 248 and/or the second drive element 250 may be any mechanism suitable to move (e.g., axially translate) the first support structure 244 and/or the second support structure 246 to approximate the first electrode 212 and the second electrode 214 and exert the clamping force to the workpiece 224. For example, the first drive element 248 and/or the second drive element 250 may be a hydraulic, pneumatic, servo-drive or mechanical drive mechanism (e.g., press).

A width-determining fixture 236 may be positioned between the first electrode 212 and the second electrode 214 to define a welding volume 256 (FIG. 14) around at least a portion of the workpiece 224. The welding volume 256 may have a width $W_1$ (FIG. 14) defined by the width-determining fixture 236. The width-determining fixture 236 may at least partially enclose the workpiece 224 to prevent the flow (e.g., laterally outward flow) of molten or hot metal 272 (FIG. 15) during resistance welding of the workpiece 224. The width-determining fixture 236 may be capable of adjusting an axial position (see longitudinal axis L in FIG. 13) with respect to the first electrode 212 and/or the second electrode 214 to ensure sides of the welding volume 256 (FIG. 14) between the first electrode 212 and the second electrode 214 are completely enclosed regardless of the axial spacing of the electrodes 212, 214 during welding. The position of the width-determining fixture 236 with respect to the workpiece 224 may define the width $W_2$ of the welded workpiece 258, as shown in FIG. 16. The width-determining fixture may optionally be moved out laterally (sideways) when not welding and moved in when welding, instead of being moved up and down. Such lateral in-and-out movements may also occur through tapered fitting tooling.

In one expression, the width-determining fixture 236 may be connected to or otherwise operably engaged with the first support structure 244 and/or the first drive mechanism 248 to approximate the second electrode 214 in response to the welding force $F_1$ (FIG. 14). In another expression, the width-determining fixture 236 may be connected to or otherwise operably engaged with the second support structure 246 and/or the second drive mechanism 250 to approximate the first electrode 212 in response to the welding force $F_2$ (FIG. 14).

The workpiece 224 may include one or more members 238, 240 intended to be joined by resistive welding. While two members 238, 240 of the workpiece 224 are shown in FIGS. 13 and 14, those skilled in the art will appreciate that additional members, such as an auxiliary member 284 (FIG. 17), may be included in the workpiece 224 without departing from the scope of the present disclosure.

The members 238, 240 of the workpiece 224 may be formed from any material capable of being joined by resistive heating. As one general example, the members 238, 240 of the workpiece 224 may be formed from any metals or metal alloys capable of being joined by resistive heating. As one specific example, members 238, 240 of the workpiece 224 may be formed from aluminum or aluminum alloys.

The member (e.g., a first member) 238 may include at least two strands 242. Each strand 242 may be formed from metal or metal alloy (e.g., aluminum or aluminum alloy). For example, the member 238 may be formed from a plurality of elongated strands 242 bundled together and having a generally circular cross-sectional shape. As a general, non-limiting example, the member 238 may be a metal wire, cable or rope. As a specific, non-limiting example, the member 238 may be a 25 mm², 40 mm² or 50 mm² stranded wire cable.

The member 240 (e.g., a second member) may be a terminal to which the member 238 (e.g., a stranded cable or wire) is joined by welding. For example, the member 240 may be a connector terminal suitable for connection (e.g., mechanical and/or electrical connection) to another object (e.g., an aircraft frame, a vehicle frame or an electrical junction).

The first engagement surface 218 of the first electrode 212 may be formed into an arcuate (e.g., curved) surface defining a concave recess 220 (FIG. 13) configured to make flush contact with at least a portion of the exterior surface 226 of the member 238. For example, the first engagement surface 218 may be machined as a generally semicircular shape or an inverted U shape defining a generally semicircular recess 220 configured to make flush contact with at least a portion of the exterior surface 226 (e.g., a semi-circular portion of the circumferential exterior surface) of the member 238 (e.g., a stranded cable or wire). However, various contours, including flat/planar, are contemplated for the first engagement surface 218.

Figure 15:
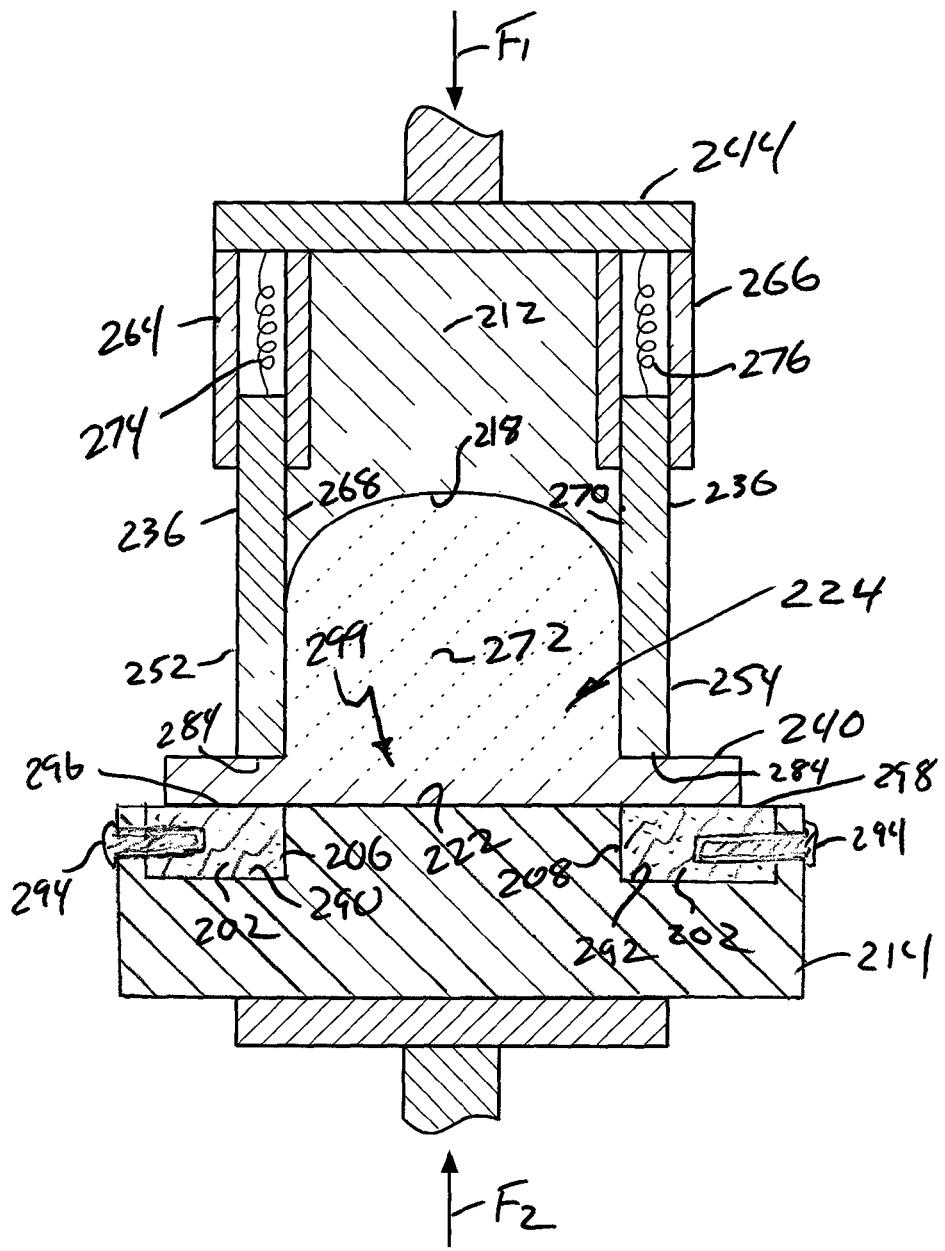
Figure 16:
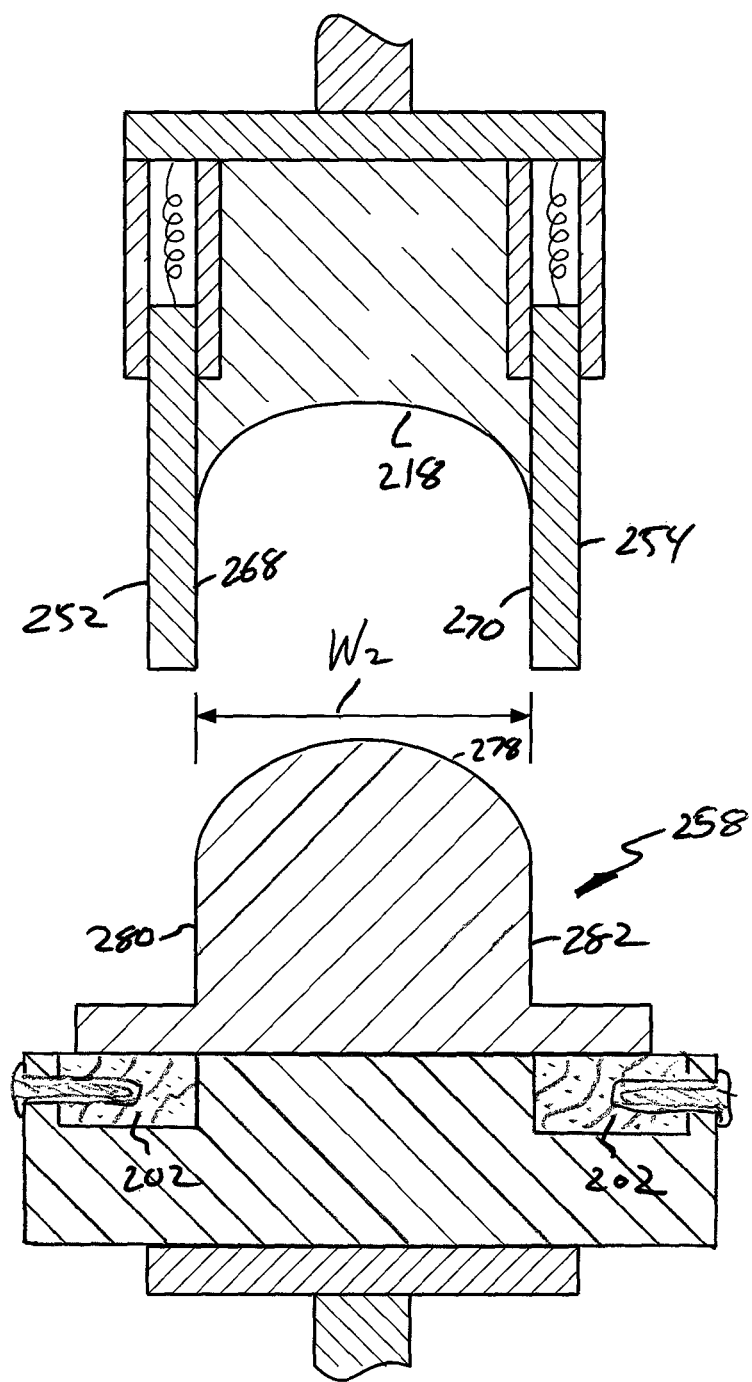

Referring to FIGS. 14 and 15, the width-determining fixture 236 may be positioned adjacent to the first electrode 212. In one construction, the width-determining fixture 236 may include a first (e.g., left) side stop 252 and a second (e.g., right) side stop 254 laterally opposed from the first side stop 252. The first side stop 252 may be positioned adjacent to (e.g., to the left of) the first electrode 212 and the second side stop 254 may be positioned adjacent to (e.g., to the right of) the first electrode 212 such that the first side stop 252 and the second side stop 254 are positioned to the sides (e.g., the left side and the right side) of the member 238 when the clamping force is exerted to the workpiece 224.

The first side stop 252 and the second side stop 254 may be formed from a material having an electrical resistance greater than that of the first electrode 212 and the second electrode 214. For example, the first side stop 252 and the second side stop 54 may be formed from a high resistance metal. As another example, the first side stop 252 and the second side stop 254 may be formed from an electrically insulating or non-conductive material, such as ceramic. In general, the material of the first side stop 252 and the second side stop 254 may be selected to ensure the electrical current is directed through the workpiece 224.

The first side stop 252 may be housed within a first sleeve 264 and the second side stop 254 may be housed within a second sleeve 266. The first sleeve 264 and the second sleeve 266 may be connected to the first support structure 244 such that the first side stop 252 and the second side stop 254 define the welding volume 256 around (e.g., to the sides of) the member 238 as the first electrode 212 approximates the second electrode 214 in response to the welding force $F_1$. When the first electrode 212 approaches the second electrode 214 and exerts the clamping force to the member 238 therebetween, the first side stop 252 and the second side stop 254 may engage the member 240 (e.g., connector terminal) adjacent to the member 238 (e.g., stranded cable). As such, the welding volume 256 may be defined by the first engagement surface 218 of the first electrode 212, an interior surface 268 of the first side stop 252, an interior surface 270 of the second side stop 254 and a portion of the exterior surface 234 (e.g., a top surface) of the member 240 positioned between the first side stop 252 and the second side stop 254.

The position of the first side stop 252 and the second side stop 254 with respect to the first sleeve 264 and the second sleeve 266, respectively, may automatically adjust an axial position (see longitudinal axis L in FIG. 13) to constantly engage the exterior surface 234 of the member 240 and contain the flow of molten metal 272 (FIG. 15) within the welding volume 256. The first side stop 252 may be outwardly biased from within the first sleeve 264 and the second side stop 254 may be outwardly biased from within the second sleeve 266. For example, the first side stop 252 may be connected within the first sleeve 264 by a first biasing element 274 (e.g., a spring) and the second side stop 254 may be connected within the second sleeve 266 by a second biasing element 276 (e.g., a spring). A bottom surface 284 (FIG. 13) of the first side stop 252 and the second side stop 254 may be substantially planar to make flush contact with the substantially planar exterior surface 234 of the member 240.

As the first support structure 244 approximates the second support structure 246 (e.g., via the first drive element 248), the first electrode 212 may move toward and exert a welding force $F_1$ (e.g., clamping force) upon the member 238 and the first side stop 252 and the second side stop 254 may simultaneously move toward and engage the member 240. As the first support structure 248 further approximates the second support structure 246, the welding force $F_1$ exerted to the member 238 by the first electrode 212 and the second electrode 214 may increase as the first electrode 212 approximates the second electrode 214; however, the first side stop 252 and the second side stop 254 may be at least partially pushed into the first sleeve 264 and the second sleeve 266, respectively, to prevent damage to the member 240 while maintaining flush contact with the member 240 and containing the outward flow of the molten metal 272 (FIG. 15).

The second engagement surface 222 of the second electrode 214 may be a substantially planar surface configured to make substantially flush contact with at least a portion of the exterior surface 234 of the member 240. For example, the second engagement surface 222 may be machined as a substantially flat shape configured to make substantially flush contact with a substantially planar portion of the exterior surface 234 (e.g., a portion of a bottom surface) of the member 240 (e.g., a connector terminal). However, various contours, including curved, are contemplated for the second engagement surface 222.

The second engagement surface 222 of the second electrode 214 may define a first recess 290 and a second recess 292. The first portion 206 of the electrically nonconductive material 202 may be inserted into the first recess 290 and the second portion 208 of the electrically nonconductive material 202 may be inserted into the second recess 292. Therefore, the sizes and shapes of the first and second portions 206, 208 may closely correspond to the sizes and shapes of the recesses 290, 292.

Optionally, mechanical fasteners 294, such as screws, pins and the like, may secure the first and second portions 206, 208 of the electrically nonconductive material 202 in the recesses 290, 292 of the second electrode 214. Other techniques for securing portions 206, 208 within corresponding recesses 290, 292, such as press fitting and adhering, are also contemplated.

The cross-sectional thicknesses of the first and second portions 206, 208 of the electrically nonconductive material 202 may closely correspond to the depth of the recesses 290, 292 such that the engagement surfaces 296, 298 of the first and second portions 206, 208 are substantially co-planar with the engagement surface 222 of the second electrode 214. Therefore, the exterior surface 234 (e.g., bottom surface) of the member 240 may make substantially flush contact with both the engagement surface 222 of the second electrode 214 and the engagement surfaces 296, 298 of the first and second portions 206, 208.

The first and second portions 206, 208 of the electrically nonconductive material 202 may be positioned relative to the second electrode 214 such that only a central portion 299 of the second electrode 214 is in electrical contact with the workpiece 224. For example, each of the first and second portions 206, 208 of the electrically nonconductive material 202 may include an inner edge 302 and an outer edge 304. The inner edge 302 of each portion 206, 208 of electrically nonconductive material 202 may be substantially vertically aligned with, or laterally inward of, the interior surfaces 268, 270 of the first and second side stops 252, 254 of the width-determining fixture 236. The outer edge 304 of each portion 206, 208 of electrically nonconductive material 202 may extend laterally outside of member 240 of the workpiece 224.

Thus, portions of the workpiece 224 (e.g., member 240) that are laterally outside of the width $W_1$ (FIG. 14) of the welding volume 256 (FIG. 14) may be electrically insulated from the underlying second electrode 214 by the first and second portions 206, 208 of the electrically nonconductive material 202, thereby focusing the welding current into the welding volume 256 rather than dissipating the welding current laterally outward. Furthermore, if the side stops 252, 254 of the width-determining fixture 236 were electrically conductive and were to extend vertically downward toward the engagement surface 222 of the second electrode (e.g., if there were no member 240 therebetween), the side stops 252, 254 would contact the first and second portions 206, 208 of the electrically nonconductive material 202 and would be electrically insulated from the second electrode 214, thereby inhibiting (if not eliminating) the formation of a shunt path through the side stops 252, 254.

Referring to FIG. 16, the welded workpiece 258 may have a shape substantially matching the shape of the welding volume 256 (FIG. 14). For example, the welded workpiece 258 may include a curved upper end 278 substantially matching the curved first engagement surface 218 of the first electrode 212, a planar first (e.g., left) side 280 substantially matching the planar first interior surface 268 of the first side stop 252 and a planar second (e.g., right) side 282 substantially matching the planar second interior surface 270 of the second side stop 254. The welded workpiece 258 may include a solidified portion of the plurality of strands 242 of the member 238 (e.g., a stranded cable) joined to the member 240 (e.g., a connector terminal) through resistive welding.

Figure 17:
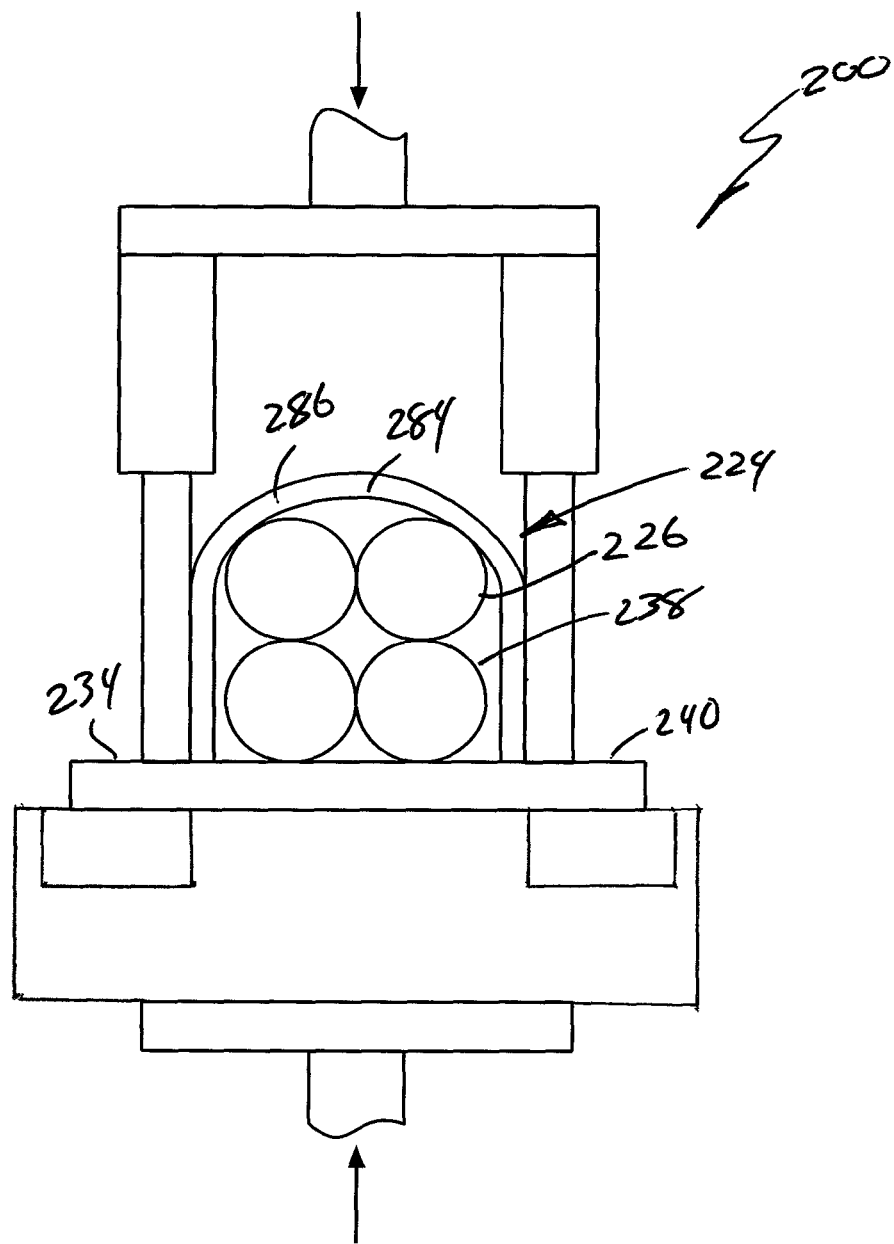
FIG. 17 is a side elevational view, in section, of a workpiece being welded by the welding assembly of FIG. 13 in accordance with another implementation of the fifth embodiment.

Referring to FIG. 17, the workpiece 224 may also include an auxiliary member 284. The auxiliary member 284 may have a size and shape sufficient to at least partially surround member 238. The auxiliary member 284 may be formed from a material having the same or similar chemistry as the members 238, 240, or from a material that is compatible with the material from which the members 238, 240 are formed. For example, when the members 238, 240 are formed from aluminum alloys, the auxiliary member 284 may be formed from an aluminum alloy or appropriate aluminum alloy filler metal.

As illustrated in FIG. 17, in one implementation, the auxiliary member 284 may be a generally semi-circular band 286 having an arcuate (e.g. curved) body (e.g., U-shaped) of sufficient size and shape to at least partially surround (e.g., cover) the exterior surface 226 of the member 238 (e.g., a stranded cable) and ends that extend to engage the exterior surface 234 of the member 240 (e.g., a connector terminal). In other implementations, the auxiliary member 284 may have other shapes, such as circular (see FIG. 7).

Figure 18:
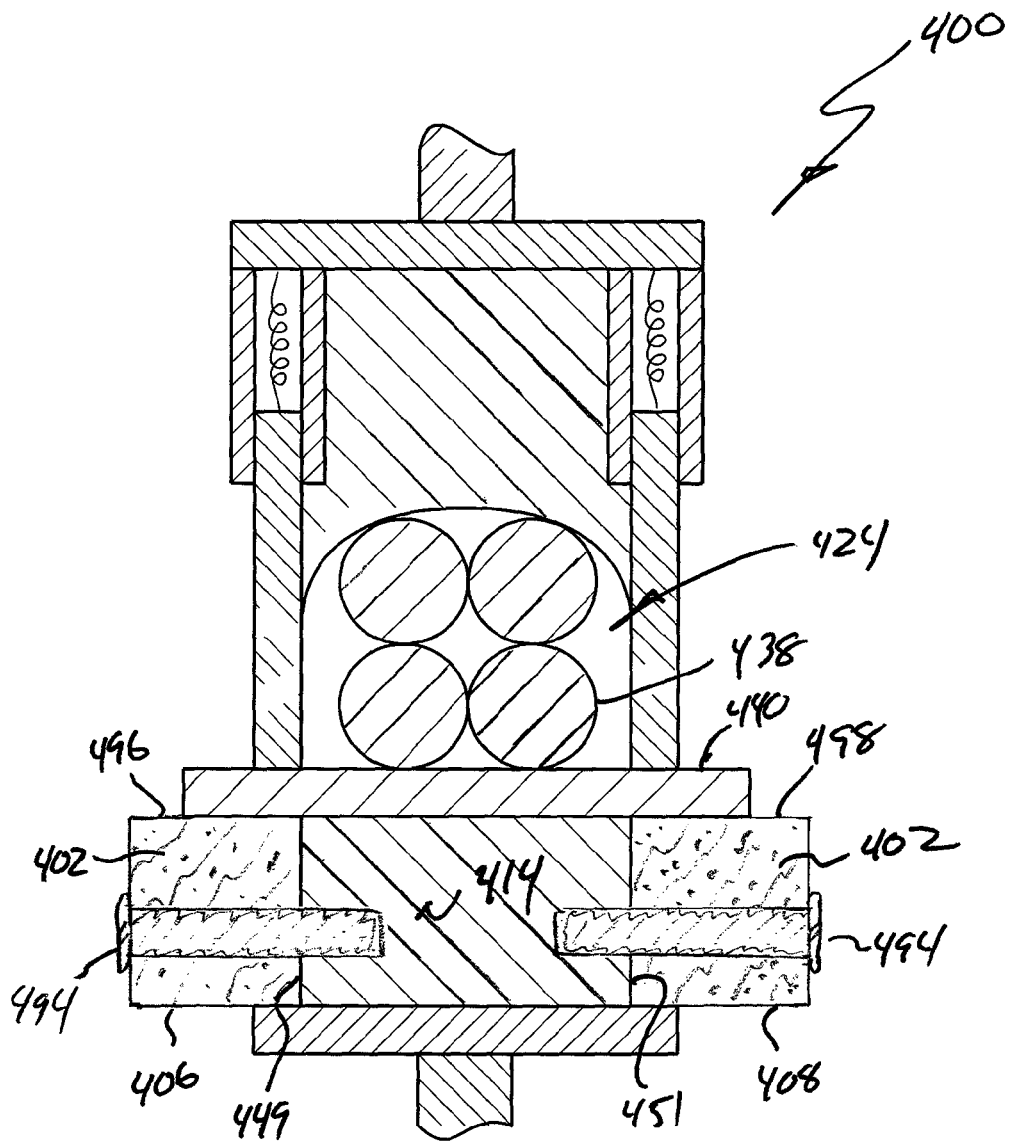
FIG. 18 is a side elevational view, in section, of a sixth embodiment of the disclosed welding assembly.

Referring to FIG. 18, a sixth embodiment of the disclosed welding assembly, generally designated 400, may be configured in the same or similar manner as the welding assemblies 200 shown in FIGS. 12-17. However, rather than inserting the electrically nonconductive material 402 into recesses (see recesses 290, 292 in FIG. 14) in the second electrode 414, the electrically nonconductive material 402 may be positioned adjacent to, and laterally outside of, the second electrode 414. Therefore, the electrically nonconductive material 402 may define an engagement surface 496 (or engagement surfaces 496, 498) that supports a portion of the workpiece 424 (e.g., member 438, member 440 and/or an auxiliary member (not shown in FIG. 18)), yet electrically isolates a portion of the workpiece 424 (e.g., the portion of the workpiece outside of the width of the welding volume) from the second electrode 414.

As one example, the electrically nonconductive material 402 of the welding assembly 400 may include two wing portions 406, 408 secured to laterally opposed sides 449, 451 of the second electrode 414 with mechanical fasteners 494. As another example, the electrically nonconductive material 402 of the welding assembly 400 may be a sleeve that extends (e.g., circumferentially) around the second electrode 414.

Figure 19:
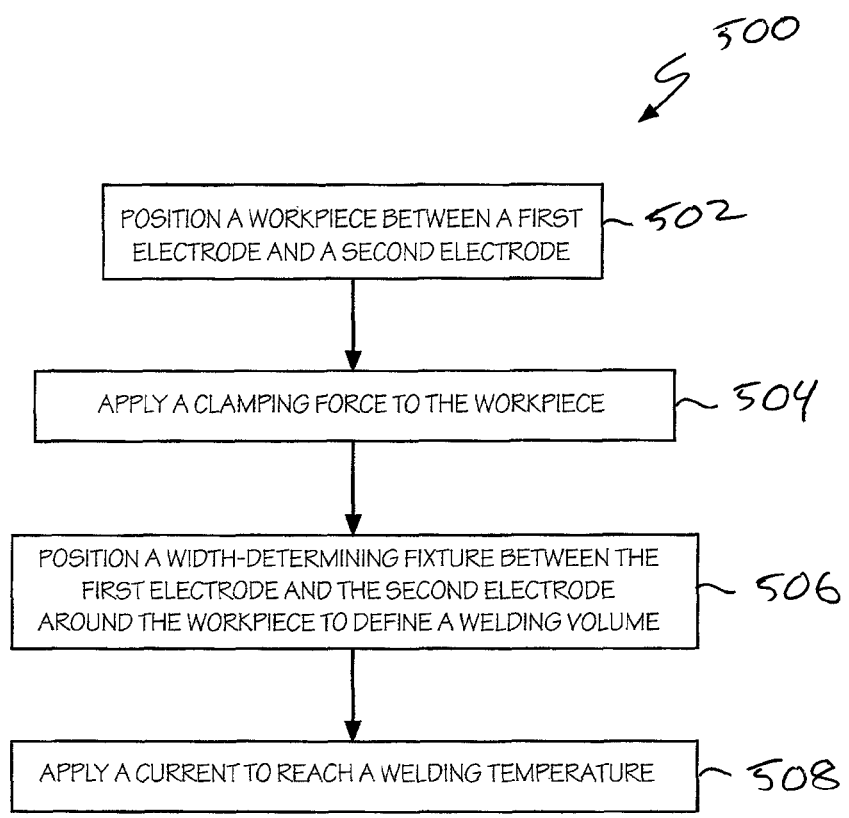
FIG. 19 is one embodiment of the disclosed method for welding metal and metal alloy stranded cable.

Referring to FIG. 19, one embodiment of the disclosed method, generally designated 500, for welding stranded metal and metal alloys (e.g., stranded cables of wires) may begin by positioning a workpiece between a first electrode and a second electrode of a welding assembly, as shown at block 502. An auxiliary member may optionally be included in the workpiece.

As shown at block 504, the first electrode and/or the second electrode may apply a clamping force to the workpiece.

As shown at block 506, a width-determining fixture may be positioned between the first electrode and the second electrode around the workpiece to define a welding volume having a lateral width.

As shown at block 508, a welding current may be passed through the workpiece for a sufficient amount of time to raise the temperature of the workpiece to a welding temperature to liquefy the workpiece. The welding current may be contained within the lateral width of the welding volume to focus the welding current into the workpiece.

Optionally, a cooling step may be introduced between the various steps of the method 500 or combined with the various steps of the method 500, such as combined with the current passing step 508. For example, the welded workpiece may be cooled by circulating cooling fluid through the fluid channels in the first and second electrodes while one or more of the first and second electrodes are engaged with the welded workpiece.

Although various embodiments of the disclosed welding assembly and method have been shown and described, modifications may occur to those skilled in the art upon reading the specification. The present application includes such modifications and is limited only by the scope of the claims.

What is claimed is:

1. A welding assembly comprising: a current generator; a first electrode electrically coupled to said current generator, said first electrode comprising a first engagement surface; a second electrode electrically coupled to said current generator, said second electrode comprising a second engagement surface, wherein said second electrode is aligned with said first electrode along a longitudinal axis, and wherein at least one of said first electrode and said second electrode is moveable along said longitudinal axis; a width-determining fixture positioned at least partially between said first electrode and said second electrode, said width-determining fixture comprising a first side stop laterally opposed from a second side stop, said first side stop, said second side stop, said first electrode and said second electrode defining a welding volume, said welding volume having a width between said first side stop and said second side stop, wherein said first side stop and said second side stop are configured to contain hot or molten metal within said width without inhibiting relative movement of said first electrode and said second electrode along said longitudinal axis; and an electrically nonconductive material connected to said second electrode.

2. The welding assembly of claim 1 wherein said second engagement surface defines a first recess and a second recess, and wherein a first portion of said electrically nonconductive material is positioned in said first recess and a second portion of said electrically nonconductive material is positioned in said second recess.

3. The welding assembly of claim 1 wherein said electrically nonconductive material comprises a ceramic material.

4. The welding assembly of claim 1 wherein said electrically nonconductive material is connected to said second electrode by a mechanical fastener.

5. The welding assembly of claim 1 wherein an axial position of said width-determining fixture is adjustable.

6. The welding assembly of claim 1 further comprising a workpiece partially positioned in said welding volume, said workpiece comprising a first member and a second member, wherein said electrically nonconductive material is positioned between said second electrode and a portion of said second member.

7. The welding assembly of claim 1 wherein said first side stop is partially received in, but biased out of, a first sleeve and said second side stop is partially received in, but biased out of, a second sleeve.

8. The welding assembly of claim 1 wherein said first side stop is operatively connected to said first electrode and a first biasing element biases said first side stop toward said second electrode, and wherein said second side stop is operatively connected to said first electrode and a second biasing element biases said second side stop toward said second electrode.

9. The welding assembly of claim 1 wherein said first side stop and said second side stop are electrically isolated from said first electrode.

10. The welding assembly of claim 2 wherein said first side stop is axially aligned with said first recess and said second side stop is axially aligned with said second recess.

11. The welding assembly of claim 2 wherein said first side stop includes a first interior surface and said second side stop includes a second interior surface, wherein said first portion includes a first inner edge and said second portion includes a second inner edge, wherein said first inner edge is axially aligned with, or laterally inward of, said first interior surface, and wherein said second inner edge is axially aligned with, or laterally inward of, said second interior surface.

12. The welding assembly of claim 2 wherein said first portion has a first portion engagement surface and said second portion has a second portion engagement surface, and wherein said first portion engagement surface and said second portion engagement surface are coplanar with said second engagement surface of said second electrode.

13. The welding assembly of claim 6 wherein said first member comprises a plurality of strands.

14. The welding assembly of claim 6 wherein said workpiece comprises aluminum or aluminum alloy.

15. The welding assembly of claim 13 wherein said workpiece further comprises an auxiliary member, wherein said auxiliary member is positioned at least partially around said first member.

16. A welding assembly comprising: a current generator; a first electrode electrically coupled to said current generator, said first electrode comprising a first engagement surface; a second electrode electrically coupled to said current generator, said second electrode comprising a second engagement surface, wherein said second electrode is aligned with said first electrode along a longitudinal axis, and wherein at least one of said first electrode and said second electrode is moveable along said longitudinal axis; a width-determining fixture comprising a first side stop laterally opposed from a second side stop, said first and said second side stops defining a welding volume between said first and said second electrodes without inhibiting relative movement of said first and said second electrodes along said longitudinal axis, said welding volume having a width between said first and said second side stops; a workpiece at least partially positioned in said welding volume and clamped between said first and said second electrodes, said workpiece comprising at least a first member and a second member, wherein said second member is supported on said second electrode, and wherein a portion of said second member protrudes outside of said width; and an electrically nonconductive material positioned between said second electrode and said portion of said second member.

17. The welding assembly of claim 16 wherein said first member comprises a plurality of strands.

18. The welding assembly of claim 16 wherein said electrically nonconductive material comprises an engagement surface that is coplanar with said second engagement surface.

19. The welding assembly of claim 16 wherein said first side stop and said second side stop are electrically isolated from said first electrode.

20. The welding assembly of claim 17 wherein said first engagement surface is curved and in engagement with said first member.

* * * * *